(12) United States Patent  
Kumano

(10) Patent No.: US 8,702,392 B2
(45) Date of Patent: Apr. 22, 2014

(54) WATER WHEEL IMPELLER BLADE TYPE POWER GENERATOR

(75) Inventor: Katsuyuki Kumano, Tokyo (JP)

(73) Assignee: Japan System Planning Co., Ltd., Tokyo (JP)

( * ) Notice: Subject to any disclaimer, the term of this patent is extended or adjusted under 35 U.S.C. 154(b) by 1315 days.

(21) Appl. No.: 12/483,171

(22) Filed: Jun. 11, 2009

(65) Prior Publication Data

US 2009/0309368 A1    Dec. 17, 2009

(30) Foreign Application Priority Data

Jun. 11, 2008    (JP) .................... 2008-152384
Apr. 23, 2009    (JP) .................... 2009-104591

(51) Int. Cl.
*F03B 3/12*    (2006.01)

(52) U.S. Cl.
USPC ........................................... 416/119

(58) Field of Classification Search
USPC .............. 416/111, 112, 117, 119; 290/43, 54
See application file for complete search history.

(56) References Cited

U.S. PATENT DOCUMENTS

| | | | | |
|---|---|---|---|---|
| 216,208 | A | * | 6/1879 | Merritt .................... 416/119 |
| 376,357 | A | * | 1/1888 | Weeks ..................... 415/146 |
| 1,083,472 | A | * | 1/1914 | Watson .................... 416/119 |
| 1,441,863 | A | | 1/1923 | Luick |
| 2004/0101397 | A1 | | 5/2004 | Godsall et al. |

FOREIGN PATENT DOCUMENTS

| | | |
|---|---|---|
| FR | 322.831 A | 7/1902 |
| FR | 2298706 A1 | 8/1976 |
| GB | 2205615 A | 12/1988 |
| JP | 2003-307173 A | 10/2003 |
| JP | 2007-231889 A | 9/2007 |
| WO | 2008/002149 A1 | 1/2008 |

OTHER PUBLICATIONS

Chinese 2nd Office Action, 100101, Mar. 12, 2012.
Translation of Chinese 2nd Office Action, 100101, Mar. 12, 2012.
Chinese Office Action.

* cited by examiner

*Primary Examiner* — Ninh H Nguyen
(74) *Attorney, Agent, or Firm* — Tracy M. Heims; Apex Juris, pllc

(57) ABSTRACT

To surely erect impeller blades at the forward movement side thereof by a rotor and, further, to surely push down these impeller blades at the backward movement side thereof by a rotor. By providing a fluid passage frame body 21 above a rotor 10 to form a fluid passage 20, rotatably disposing impeller blades 15 on rotor 10, forming a fluid receiving part 15a and a stopper part 15b shorter than this fluid receiving part into an L shape, and disposing stopper part 15b on the side of fluid receiving part 15a receiving fluid pressure from fluid passage 20 such as to maintain fluid receiving part 15a in an erected position. An impeller blade erecting passage pipe 30 is formed on rotor 10 such that the diameter of one end thereof 30a is larger than the diameter of the other end thereof 30b. An inclined plate 31 and an impeller blade downward passage pipe 32 is provided on the outlet side of fluid passage 20, this impeller blade downward passage pipe 32 formed such that one end thereof 32a on the inclined plate 31 side has a larger diameter than the other end thereof 32b on an impeller blade passage frame body 22.

2 Claims, 14 Drawing Sheets

FIG. 10
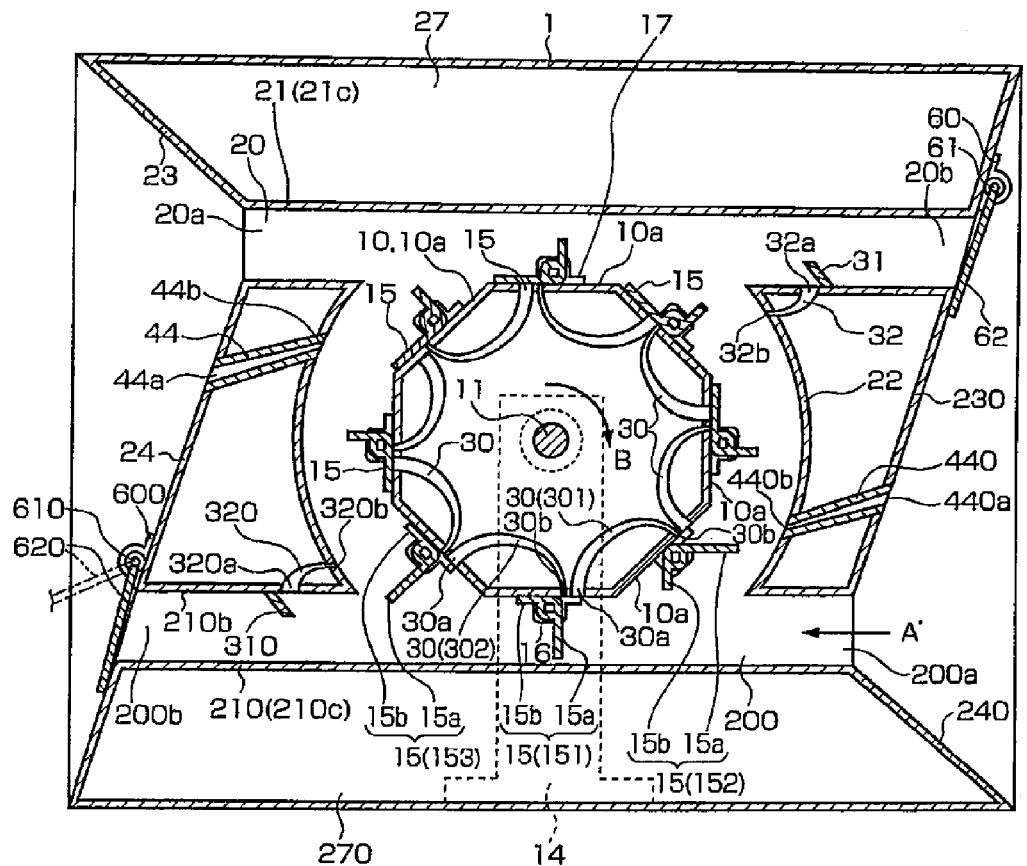
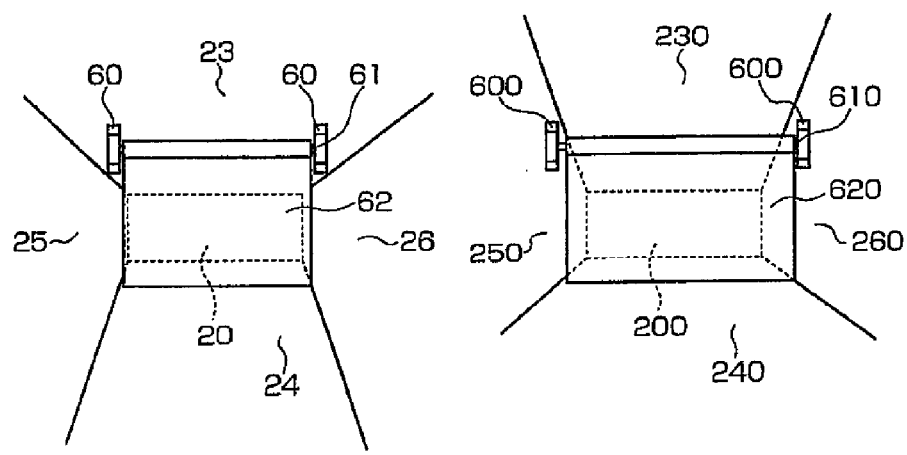
FIG. 11(A)    FIG. 11(B)

FIG. 17
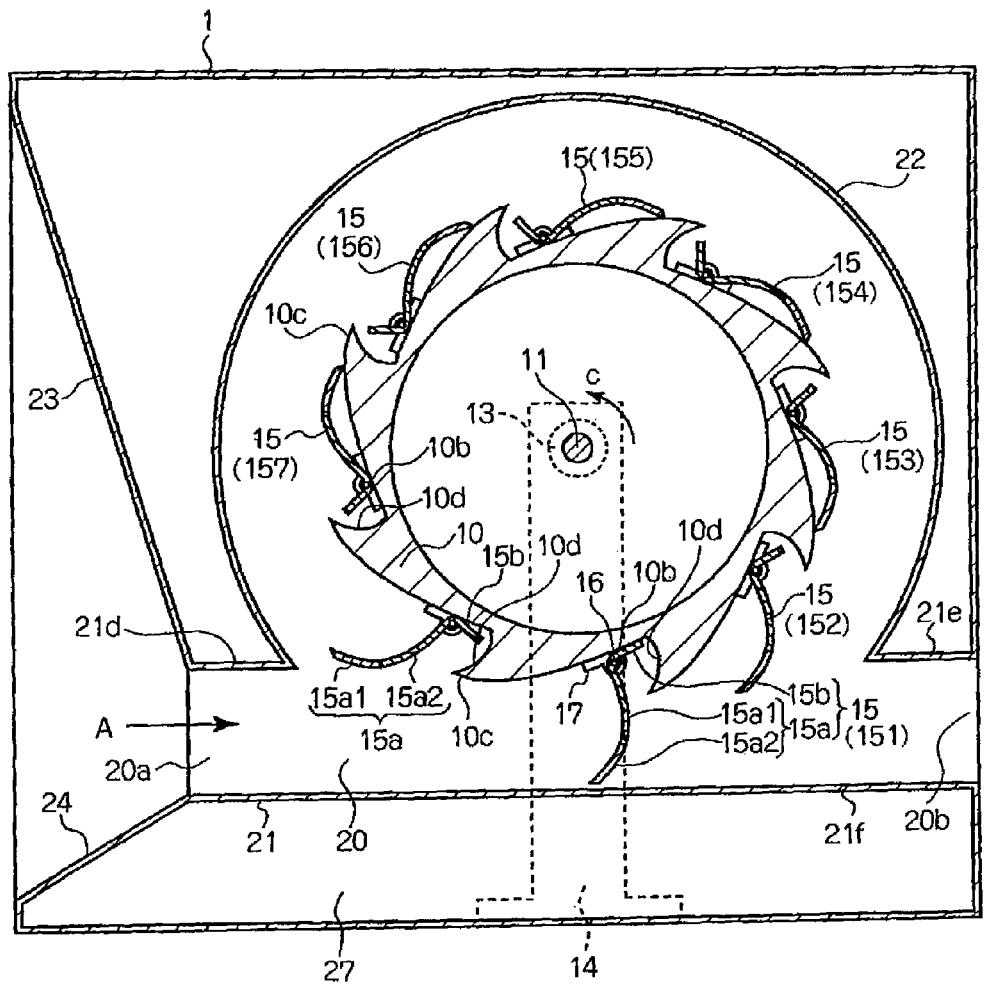
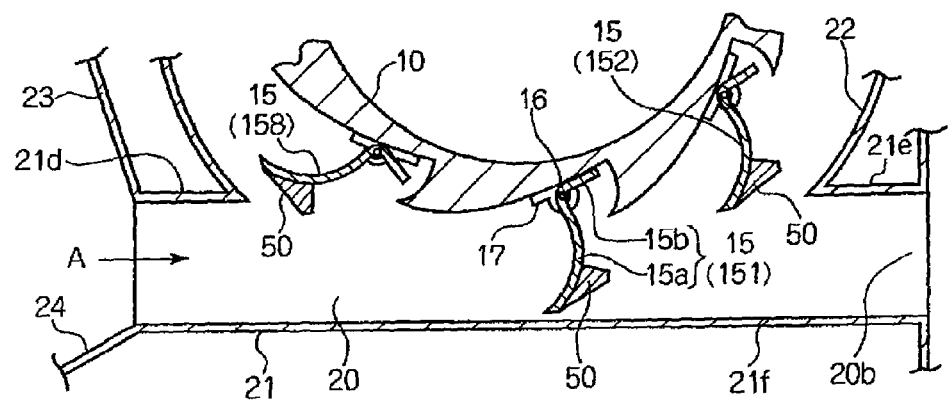
FIG. 18

WATER WHEEL IMPELLER BLADE TYPE POWER GENERATOR

FIELD OF THE INVENTION

The present invention relates to a water wheel impeller blade type power generator using flowing water, seawater or the like in, for example, a river or the sea to generate hydraulic power.

In the prior art, there have been small and simple impeller blade wheels for hydraulic power generation proposed in the form of propellers or water wheels. Propeller type impeller blade wheels are not preferable due to the fact that they have much higher resistances to water than to air, resulting in a degree of rotational velocity and torque insufficient for hydraulic generation. On the other hand, Water wheel type impeller blade wheels are easily actualized because they use flowing water near the surface of the water. However, the following problems have been encountered when installing in water or seawater and rotating such water wheel type impeller blade wheels by flowing water or flowing seawater.

Resistance from flowing water or the like is applied to impeller blades on the forward movement sides (same direction as flowing water or the like) and backward movement sides (direction opposite flowing water or the like) thereof as the water wheel comprising these impeller blades rotates in the same direction as the flow of water or the like, thus making it difficult for the water wheel to rotate. Proposals have thus been made to push down the receiving sides of impeller blades and thereby reduce resistance on the backward movement side of the water wheel by rotatably-configuring the impeller blades constituting a water wheel and erecting the receiving surfaces of impeller blades to be approximately orthogonal with the flow of water or the like, thus allowing a greater degree of fluid pressure to be received by the forward movement side of the impeller blades receiving fluid pressure from flowing water or the like and thereby rotating them in the same direction as that flow. This type of water wheel impeller blade type power generator is demonstrated in, for example, Patent Citation 1 and Patent Citation 2.

[Patent Citation 1] Japanese Published Unexamined Application No. 2003-307173
[Patent Citation 2] Japanese Published Unexamined Application No. 2007-231889

Patent Citation 1 describes a configuration in which there are a plurality of groove-shaped rotary vanes (impeller blades) around an inner cylinder forming the center of a rotating shaft, the water wheel opening at a specified angle only on a side (forward movement side of the impeller blades) in which the rotary vanes receive water at their groove surfaces, and closing at the opposite side (backward movement side). Additionally, the invention of Patent Citation 1 is a buoyant type of device, wherein buoyancy is transmitted to the inner cylinder only to support the weight of the device, or a plurality of buoyant bodies are provided in the width direction of the flowing water, thereby supporting the entire device and causing the upper ends of the rotary vales to be exposed slightly in the air. Further, an inclined plate is installed at the bottom of a river or the bottom of the sea such that the fluid pressure from flowing water is applied only to the upper portion of the water wheel.

Patent Citation 2 describes a configuration in which a water wheel comprises a rotating shaft, at least one pair of rotating discs is integrally provided upon that rotating shaft, and a plurality of impeller blades are provided between the adjacent rotating discs, wherein the aforementioned water wheel is rotatably supported upon a rotating member via the aforementioned rotating shaft, and the water wheel is rotated by the fluid thrust of a flowing fluid, thereby obtaining power. Then, a plurality of groups of impeller blades are provided in the circumferential direction between the adjacent rotating discs, each group having a plurality of impeller blades provided in the radiating direction, and each of these impeller blades installed on one of the adjacent rotating discs such as to be able to rise and fall, while stoppers are provided on the other adjacent disc to lock each of the impeller blades into an erected state, such that when one group of a plurality of impeller blades is erected a bucket-shaped groove is formed between the impeller blades in one group and the adjacent rotating disc.

In this way, with configuration described in Patent Citation 2, when each impeller blade is mounted on an adjacent rotating disc such that the impeller blades are able to rise and fall and the one group of a plurality of impeller blades provided in the radiating direction is erected, these impeller blades and the adjacent rotating disc constitute a bucket-shaped groove. As such, when each impeller blade rotates in the returning direction, the impeller blades fall to the rotating disc side, thus reducing fluid resistance. Further, rotational velocity and rotational torque can be actualized by maintaining fluid thrust of the flowing fluid by implementing a configuration in which each of the impeller blades form a bucket-shaped groove with the rotating discs on the forward movement side rotating in approximately the same direction as the flow of fluid.

DISCLOSURE OF THE INVENTION

Patent Citation 1 attempts to prevent the application of fluid pressure to the lower side of the water wheel by providing an inclined plate, but it is extremely difficult to prevent fluid pressure from being applied to the bottom side of a water wheel in a river or the sea. Further, the inclined plate is installed at the bottom of a river or the bottom of the sea, rendering the inclined plate immovable. On the other hand, by constructing this water wheel as a buoyant type of water wheel, the position of the water wheel can be changed according to an increase or decrease in water volume, so the upward and downward positional relationship between the water wheel and the inclined plate can be changed from this point also, thus making it difficult to prevent fluid pressure from being from being applied to the bottom side of the water wheel. As such, with the method of Patent Citation 1, it is nearly impossible to surely obtain rotational velocity and rotational torque. Moreover, even if, for example, the rotary vale falls down to the inner cylinder side by its backward movement side, it is nonetheless extremely difficult to surely erect the rotary vales falling due to the relationship between rotary vales and the inner cylinder only by means of fluid pressure from flowing water or the like produced by a natural flow of water.

In Patent Citation 2, it is easy for each erected impeller blade to fall to the rotating disc side by their returning sides by means of fluid pressure. However, as is the case with Patent Citation 1, it is extremely difficult to surely erect the impeller blades (at their backward movement sides) falling due to the relationship between the impeller blades and the rotating discs only by means of fluid pressure from flowing water or the like produced by a natural flow of water.

In light of these problems in the prior art, it is thus the object of the present invention to provide a water wheel impeller type power generator capable of surely erecting impeller blades at the forward movement side thereof by means of a rotor and, further, capable of surely pushing down impeller blades at the backward movement side thereof by means of a rotor.

In order to solve the above-described problems, the present invention provides a water wheel impeller type power generator comprising a rotating shaft transmitting power to a generator, a rotor fixed onto this rotating shaft, and impeller blades provided on the outer periphery of this rotor and serving to rotate the aforementioned rotor by receiving a flow of fluid, characterized in that a fluid passage frame body is disposed below the aforementioned rotor to form a fluid passage, with the aforementioned impeller blades being rotatably disposed on the aforementioned rotor, a fluid receiving part and a stopper part shorter than this fluid receiving part are both formed in an L shape, the aforementioned stopper part is disposed on the side of the fluid receiving part receiving fluid pressure from the fluid passage such as to maintain the fluid receiving part in an erected position, an impeller blade passage frame body is disposed on the outer periphery of the aforementioned rotor in such a way as to surround the rotor without inhibiting rotation of the aforementioned impeller blades, an impeller blade erecting means is disposed on the aforementioned rotor in order to erect the fluid receiving part provided on the impeller blade moving from the aforementioned impeller blade passage frame body and into the aforementioned fluid passage, and an impeller blade push-down means for pushing down the fluid receiving part of the impeller blades is provided on the lower plates of the aforementioned fluid passage frame body and the impeller blade passage frame body.

In order to solve the above-described problems, the present invention provides a water wheel impeller type power generator comprising a rotating shaft transmitting power to a generator, a rotor fixed onto this rotating shaft, and impeller blades provided on the outer periphery of this rotor and serving to rotate the aforementioned rotor by receiving a flow of fluid, characterized in that fluid passage frame bodies are disposed above and below the aforementioned rotor to each form a fluid passage, the aforementioned impeller blades are rotatably disposed on the aforementioned impeller blades, a fluid receiving part and a stopper part shorter than this fluid receiving part are both formed in an L shape, with this stopper part being disposed such as to maintain the fluid receiving part in an erected position on the side of the fluid receiving part receiving fluid pressure from the fluid passage, an impeller blade passage frame body is disposed on the outer periphery of the aforementioned rotor in such a way as to surround the rotor without inhibiting rotation of the aforementioned impeller blades, an impeller blade erecting means is disposed on the aforementioned rotor in order to erect the fluid receiving part provided on the impeller blade from within the aforementioned impeller blade passage frame body into the aforementioned fluid passage, an impeller blade push-down means for pushing down the fluid receiving part of the impeller blades is provided on the lower plates of the aforementioned fluid passage frame body and the impeller blade passage frame body, and the upper portions of fluid inflow prevention plates covering each of the fluid passages are rotatably provided on the outside of the aforementioned upper and lower fluid passages.

In order to solve the above-described problems, the present invention provides the water wheel impeller type power generator, further characterized in that the aforementioned impeller blade erecting means is provided with impeller blade erecting passage pipes adjacent to the inner portion of the rotor, passing through the inner portion thereof, and communicating between each of the aforementioned impeller blades, wherein one end of each of the aforementioned impeller blade erecting passage pipes runs from the impeller blade fluid receiving part side to the other end of each of the aforementioned impeller blade erecting passage pipes provided on the fluid receiving part side of an impeller blade which is adjacent to the rotational direction and reverse direction of the rotor, and wherein the aforementioned impeller blade erecting passage pipes are formed such that one end thereof is larger in diameter than the other end thereof.

In order to solve the above-described problems, the present invention provides the water wheel impeller type power generator, further characterized in that the aforementioned impeller blade erecting means comprises an inclined plate provided in the inside portion of the aforementioned fluid passage frame body and sloping in the fluid flow direction to the inlet side of the fluid passage, and additionally comprises an impeller blade erecting passage pipe provided such as to be communicated from the aforementioned lower plate on the fluid receiving side of the inclined plate to the inside of the aforementioned impeller blade passage frame body, wherein the aforementioned impeller blade erecting passage pipe is formed such that one end thereof on the side of the aforementioned inclined plate has a larger diameter than the other end thereof on the side of the impeller blade passage frame body.

In order to solve the above-described problems, the present invention provides the water wheel impeller type power generator, further characterized in that the aforementioned impeller blade erecting means is comprised of an impeller blade erecting passage pipe arranged to slope in the fluid passage direction such as to communicate from the outside corresponding to the aforementioned fluid passage frame body of the inlet of the aforementioned fluid passage to the inside of the aforementioned impeller blade passage frame body, wherein the aforementioned impeller blade erecting passage pipe is formed such that one end thereof on the outside corresponding to the aforementioned fluid passage frame body is larger in diameter than the other end thereof on the impeller blade passage frame body side.

In order to solve the above-described problems, the present invention provides the water wheel impeller type power generator, further characterized in that the aforementioned impeller blade push-down means comprises an inclined plate provided in the inside portion of the aforementioned fluid passage frame body and sloping in the fluid flow direction to the outlet side of the fluid passage, and additionally comprises an impeller blade downward passage pipe provided such as to be communicated from the aforementioned fluid passage frame body on the fluid receiving side of this inclined plate to the inside of aforementioned impeller blade passage frame body, wherein the aforementioned impeller blade downward passage pipe is formed such that one end thereof on the side of the aforementioned inclined plate has a larger diameter than the other end thereof on the side of the impeller blade passage frame body.

In order to solve the above-described problems, the present invention provides the water wheel impeller type power generator, further characterized in that a pillow member abutting the aforementioned impeller blades is provided on the aforementioned rotor.

In order to solve the above-described problems, the present invention provides the water wheel impeller type power generator, further characterized in that an air chamber is formed in the upper portion of the fluid passage frame body.

In order to solve the above-described problems, the present invention provides the water wheel impeller type power generator, further characterized in that fluid guide plates are provided on the inlet side of the aforementioned fluid passage, which is rectangular shaped, and slope toward the outside from this inlet.

In order to solve the above-described problems, the present invention provides a water wheel impeller type power generator comprising a rotating shaft transmitting power to a generator, a rotor fixed onto this rotating shaft, and impeller blades provided on the outer periphery of this rotor and serving to rotate the aforementioned rotor by receiving a flow of fluid, characterized in that a fluid passage frame body is disposed below the aforementioned rotor to form a fluid passage, with the aforementioned impeller blades being rotatably disposed on the aforementioned rotor, a fluid receiving part and a stopper part shorter than this fluid receiving part are both formed in an L shape, the aforementioned stopper part is disposed on the side of the fluid receiving part receiving fluid pressure from the fluid passage such as to maintain the fluid receiving part in an erected position, an impeller blade passage frame body is disposed on the outer periphery of the aforementioned rotor in such a way as to surround the rotor without inhibiting rotation of the aforementioned impeller blades, and a weight is provided on the aforementioned fluid receiving part.

In order to solve the above-described problems, the present invention provides the water wheel impeller type power generator, further comprising an inclined plate provided on the upper plate of the aforementioned fluid passage frame body and sloping in the fluid flow direction to the inlet side of the fluid passage, and additionally comprising an impeller blade erecting passage pipe provided such as to communicate from the aforementioned upper plate of the fluid receiving side of the aforementioned inclined plate to the inside of the impeller blade passage frame body, wherein one side of the aforementioned impeller blade erecting passage pipe on the side of the aforementioned inclined plate is larger in diameter than the other end thereof on the side of the impeller blade passage frame body.

In order to solve the above-described problems, the present invention provides the water wheel impeller type power generator, further characterized in that the aforementioned fluid guide plates comprise upper and lower fluid guide plates each extending in the respective upper or lower direction from an upper and a lower end of the aforementioned inlet, and additionally comprises left and right fluid guide plates each extending in the respective left or right direction from a left and right end of the aforementioned inlet, wherein the aforementioned lower end of the aforementioned inlet is formed behind the aforementioned upper end thereof.

In order to solve the above-described problems, the present invention provides the water wheel impeller type power generator, further characterized in that the aforementioned fluid guide plates comprise upper and lower fluid guide plates each extending in the respective upper or lower direction from an upper and a lower end of the aforementioned inlet, and additionally comprises left and right fluid guide plates each extending in the respective left or right direction from a left and right end of the aforementioned inlet, wherein fluid guide projections are provided on the aforementioned upper and lower fluid guide plates and left and right fluid guide plates such as to generate a vortex and thereby allow the fluid to flow into the aforementioned inlet.

In order to solve the above-described problems, the present invention provides the water wheel impeller type power generator, further characterized in that a front end on the inlet side of the upper plate of the aforementioned fluid passage frame body and a back end of the outlet side in the same location are formed in a radial distance of the rotor running from above the center of the aforementioned rotating shaft to the inlet side and the outlet side respectively.

In order to solve the above-described problems, the present invention provides the water wheel impeller type power generator, further characterized in that fluid guide plates are provided on the aforementioned inlet side and the aforementioned outlet side and sloping toward the outside from the aforementioned inlet side and the aforementioned outlet side respectively.

Because an impeller blade erecting means comprising an impeller blade erecting passage pipe is provided on the rotor, flowing water coming into contact with impeller blades positioned and erected in the fluid passage flows to impeller blade erecting passage pipe. Because one end of impeller blade erecting passage pipe on the side of the fluid passage is formed with a larger diameter than the other end thereof on the impeller blade passage frame body side, the impeller blade erecting passage pipe serves as a nozzle through which flowing water is vigorously sprayed onto, thereby erecting, the impeller blades moving from the impeller blade passage frame body and into the fluid passage. In this way, because fluid is strongly sprayed such as to forcibly erect impeller blade 15, impeller blade 15 is surely erected. Furthermore, by providing an impeller blade push-down means comprising inclined plate and impeller blade downward passage pipe on the outlet side of fluid passage, it is possible for fluid coming into contact with inclined plate to flow to impeller blade downward passage pipe. Because one end of the impeller blade downward passage pipe on the inclined plate side is formed with a larger diameter than the other end on the impeller blade passage frame body, impeller blade downward passage pipe serves as a nozzle to vigorously spray the fluid onto, and thereby push down, impeller blade which moves from fluid passage and into impeller blade passage frame body. In this way, because fluid is strongly sprayed such as to forcibly push down impeller blade 15, impeller blade 15 is surely pushed down.

A fluid passage is provided below the rotor, which is effective for efficiently generating power during both a high tide and a low tide when the device is installed in the sea.

An air chamber is formed in the upper portion of the fluid passage frame body and, because this air chamber serves as a buoyant body, it is preferable that the device be installed at a mid-position in a river or the sea. Further, fluid guide plates provided on the inlet side of the fluid passage and sloping from the inlet to the outside, thereby accelerating the flow rate of fluid travelling along the fluid passage, thus allowing strong fluid pressure to be applied to the impeller blades and allowing the rotor to be efficiently rotated.

Because resistance in the fluid passage is reduced, fluid efficiently flows to the fluid passage, thus improving power generation efficiency. Further, a fluid guide plate on the inlet side and a fluid guide plate on the outlet side also form inclined plates, thus creating a pressure reducing part on the back side, thereby generating a suction effect towards the fluid passage of the flowing fluid and, as a result, further improving generation efficiency.

BRIEF DESCRIPTION OF THE DRAWINGS

FIG. 4 shows the relevant parts of the second embodiment of the inventive water wheel impeller blade type power generator, wherein (a) is a cross-sectional view, (b) is a right side view of (a), and (c) is a plane view of (a);

FIG. 5 shows the relevant parts of the third embodiment of the inventive water wheel impeller blade type power generator, wherein (a) is a cross-sectional view, (b) is a plane view of (a);

FIG. 10 is a schematic side cross-sectional view of the embodiment shown in FIG. 9 in the case that the flow of seawater has changed;

FIG. 11 shows the relevant parts of an ocean current inflow preventing means from FIG. 9 and FIG. 10, wherein (a) is a front view and (b) is a rear view;

FIG. 17 is a schematic side cross-sectional view of the twelfth embodiment of the inventive water wheel impeller blade type power generator;

FIG. 18 is a schematic side cross-sectional view of the thirteenth embodiment of the inventive water wheel impeller blade type power generator.

DESCRIPTION OF THE PREFERRED EMBODIMENTS

Figure 1:
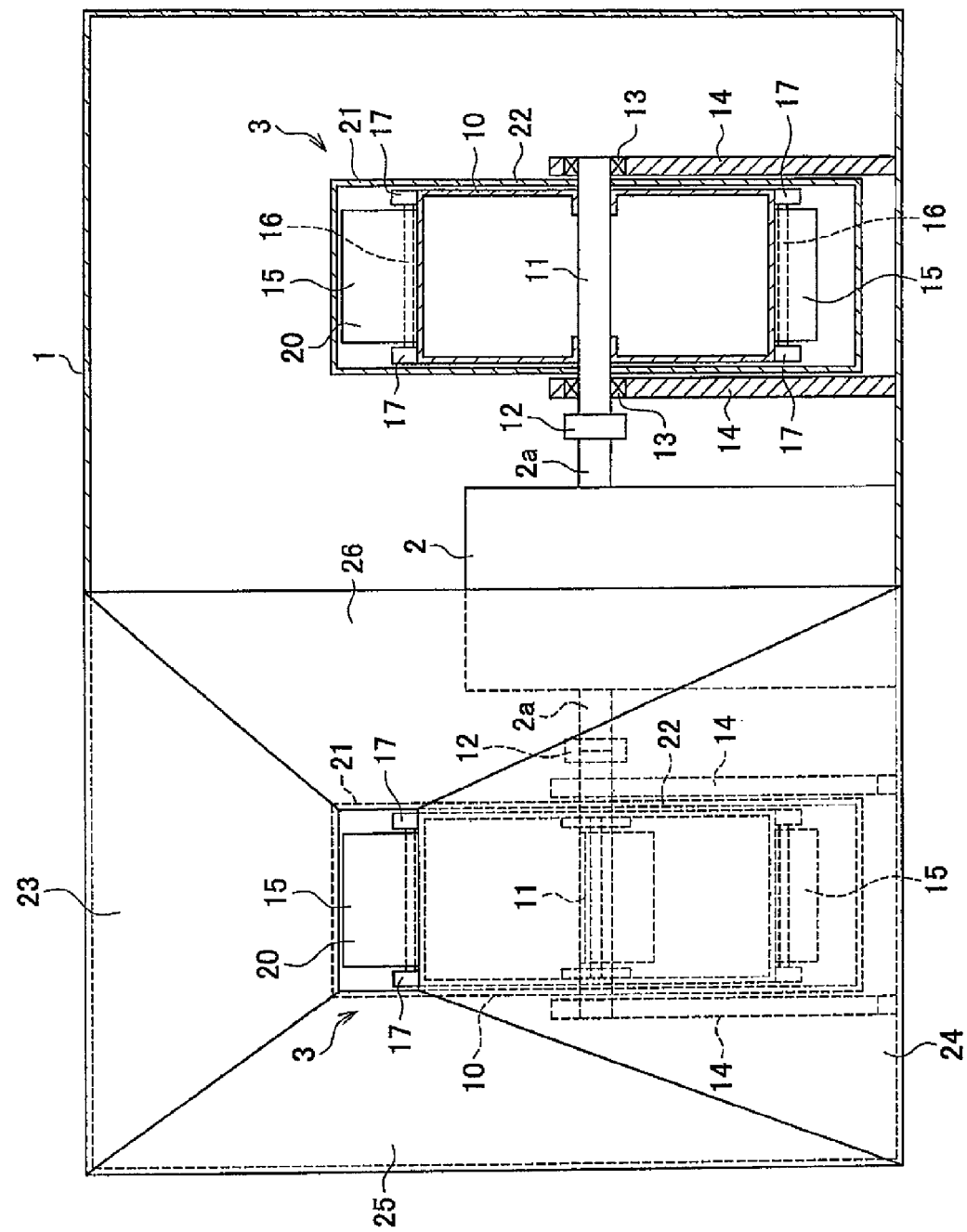
FIG. 1 is a front view of the first embodiment of the inventive water wheel impeller blade type power generator with the right half shown as a cross-sectional view.

A first embodiment of the inventive water wheel impeller type power generator will now be explained in reference to FIG. 1 through FIG. 3. A generator 2 having an input shaft 2a, 2a' on both of its sides is centrally-fixed within a device frame body 1. A water wheel impeller blade type power generator 3, 3' is disposed on both sides of generator 2. This water wheel impeller blade type power generator 3 is structured as follows.

A rotor 10 with an outer periphery formed in an octagon shape is fixed to a rotating shaft 11, and rotating shaft 11 is connected to the input shaft 2a of generator 2 through a joint 12. Rotating shaft 11 is rotatably supported by support plates 14 through bearings 13, and support plate 14s are fixed to the bottom plate of device frame body 1. L-shaped impeller blades 15 are fixed onto an impeller blade mounting surface 10a on the outer periphery of rotor 10, these impeller blades 15 each comprising a fluid receiving part 15a for receiving water or the like and a stopper part 15b. Both end portions of a supporting shaft 16 are rotatably supported by bearings 17, and bearings 17 are fixed onto impeller blade mounting surface 10a. At this point, the impeller blades 15 are disposed such that fluid receiving part 15a receives water or the like; that is, impeller blades 15 are disposed such as to be moved in a flow direction A.

A fluid passage frame body 21 excepting the rotating portions of impeller blades 15 is fixed to device frame body 1 such as to form a rectangular-shaped fluid passage 20 in the upper portion of rotor 10. Further, below fluid passage 20, the upper end of impeller blade frame body 22 is fixed to lower plates 21a, 21b of fluid passage frame body 21 and surrounds the outer periphery of rotor 10 to avoid inhibiting the rotation of impeller blades 15. Upper and lower fluid guide plates 23, 24 sloping toward the outside from the upper and lower ends of inlet 20a and left and right fluid guide plates 25 and 26 sloping toward the outside from the left and right ends of inlet 20a are fixed to device frame body 1 and fluid passage frame body 21 such that fluid may vigorously flow into an inlet 20a of fluid passage 20. At this point, an air chamber 27 is formed by an upper plate 21c of fluid passage frame body 21, upper fluid guide plate 23, and by device frame body 1. This air chamber 27 serves as a buoyant body and, as such, is preferable in the case that device frame body 1 is installed in a mid-position of a river, sea, or the like. Of course, it is not necessary for air chamber 27 to be formed in the case that device frame body 1 is installed at the bottom of a river, sea, or the like.

An impeller blade erecting passage pipe 30 is fixed to adjacent impeller blade mounting surfaces 10a, 10a' through the inner portion of rotor 10. Impeller blade erecting passage pipe 30 is disposed such that one end thereof 30a runs from the side of fluid receiving part 15a of impeller blade 15 and the other end thereof 30b runs into the side of fluid receiving part 15a of the impeller blade mounting surface 10a adjacent to the rotational direction B and reverse direction of the rotor. Here, the circumferential surface of impeller blade erecting passage pipe 30 is formed into a trumpet-shaped circular cross-section such that one end 30a is formed with a larger diameter than the other end 30b. That is, a nozzle-shaped flow passage is created from one end 30a to the other end 30b.

An inclined plate 31 inclined to the fluid flow direction A side is fixed upon lower plate 21b of the outlet 20b side of fluid passage frame body 21, and an impeller blade downward passage pipe 32, formed similar to impeller blade erecting passage pipe 30, is also fixed on this lower plate 21b such as to run from lower plate 21b of the outlet 20b side of fluid passage frame body 21 towards impeller blade passage frame body 22. Impeller blade downward passage pipe 32 is formed into a trumpet-shaped circular cross-section such that one end 32a is formed with a larger diameter than the other end 32b. That is, a nozzle-shaped flow passage is created from one end 32a to the other end 32b.

The action of this embodiment will hereinafter be explained. Here, impeller 15 positioned in fluid passage 20 will be indicated by the numeral 151, the impeller blade 15 behind this impeller blade 151 will be indicated by the numeral 152, and the impeller blade 15 in front of this impeller blade 151 will be indicated by the numeral 153. Additionally, impeller blade erecting passage pipe 30 extending from impeller blade mounting surface 10a of impeller blade 151 to impeller blade mounting surface 10a of impeller blade 152 will be explained as numeral 301, while impeller blade erecting passage pipe 30 extending from impeller blade mounting surface 10a of impeller blade 153 to impeller blade mounting surface 10a of impeller blade 151 will be explained as numeral 302. Furthermore, impeller blades 15 will be explained according to the configuration shown in FIG. 2.

When the present device is arranged and fixed at a predetermined position in water or in the sea, flow rate of the fluid is accelerated by upper and lower fluid guide plates 23, 24 and by left and right fluid guide plates 25, 26, thereby allowing the fluid to flow into inlet 20a of fluid passage 20. Impeller 151 is then rotated in the direction of arrow B by means of fluid flowing in the direction of arrow A. A portion of the fluid coming into contact with fluid receiving part 15a of impeller blade 151 flows into impeller blade erecting passage pipes 301, 302.

Fluid flowing through one end 30a of impeller blade erecting passage pipe 301 is accelerated by the nozzle shape of impeller blade erecting passage pipe 301, whereafter this fluid is sprayed from the other end 32b onto fluid receiving part 15a of impeller blade 152, thereby erecting impeller blade 152. When impeller 152 becomes positioned within fluid passage 20 in an even slightly erected state, impeller blade 152 is completely erected until stopper part 15b abuts impeller blade mounting surface 10a via fluid flowing through fluid passage 20. Additionally, fluid also flows into the other end 30b of impeller blade passage pipe 302, but because this other end 30b is smaller in diameter than one end 30a, fluid flowing into the other end 30b is decelerated, thus preventing impeller blade 153 from being influenced.

Furthermore, fluid flowing through fluid passage 20 comes into contact with inclined plate 31, flows into one end 32a of impeller blade downward passage pipe 32, thereby accelerating the fluid, and thus causing it to flow out from the other end 32b and into impeller blade passage frame body 22. Rotor 10 is thereby rotated, causing impeller blade 153 to take a position corresponding to other end 32b, at which point the fluid accelerated by impeller blade downward passage pipe 32 is received by fluid receiving part 15a of impeller blade 153, thus causing fluid receiving part 15a to move downward. That is, fluid receiving part 15a falls by the backward movement side of impeller blade 15, causing the short stopper part 15b to receive fluid pressure, thus reducing fluid resistance. Here, stopper part 15b may have a stopper function maintaining the erected state of fluid receiving part 15b, and it is needless to say that it is ideal for stopper part 15b to be as short as possible.

When rotor 10 is rotated by means of the above-described action, the rotation of rotating shaft 11 is transmitted to input shaft 2a, thus causing electricity to be generated by generator 2.

In this way, by providing an impeller blade erecting means comprising impeller blade erecting passage pipe 30 on rotor 10, it is possible for fluid coming into contact with impeller blade 15 positioned and erected in fluid passage 20 to flow to impeller blade erecting passage pipe 30. Because one end 30a of impeller blade erecting passage pipe 30 is formed with a larger diameter than the other end 30b thereof, impeller blade erecting passage pipe 30 serves as a nozzle to vigorously spray the fluid onto, and thereby erect, impeller blade 15 which moves from impeller blade passage frame body 22 into fluid passage 20. In this way, because fluid is strongly sprayed such as to forcibly erect impeller blade 15, impeller blade 15 is surely erected.

Furthermore, by providing an impeller blade push-down means comprising inclined plate 31 and impeller blade downward passage pipe 32 on the outlet side of fluid passage 20, it is possible for fluid coming into contact with inclined plate 31 to flow to impeller blade downward passage pipe 32. Further, because one end 32a on the inclined plate 31 side is formed with a larger diameter than the other end 32b on the impeller blade passage frame body 22, impeller blade downward passage pipe 32 serves as a nozzle to vigorously spray the fluid onto, and thereby push down, impeller blade 15 which moves from fluid passage 20 and into impeller blade passage frame body 22. In this way, because fluid is strongly sprayed such as to forcibly push down impeller blade 15, impeller blade 15 is surely pushed down.

Moreover, when air chamber 27 is formed above fluid passage frame body 21, air chamber 27 thus serves as a buoyant body and, as such, is preferable in the case that device frame body 1 is installed in a mid-position of a river, sea, or the like. Additionally, when fluid guide plates 23, 24, 25, and 26 are provided on the inlet 20a side of fluid passage 20 and slope from inlet 20a towards the outside, fluid flowing into fluid passage 20 running along these fluid guide plates 23, 24, 25, and 26 is accelerated, thus allowing strong fluid pressure to be applied to impeller blade 15 and, thereby, allowing rotor 10 to be surely rotated.

A second embodiment of the inventive water wheel impeller type power generator will now be explained in reference to FIG. 4. This second embodiment actualizes further alleviation of resistance to the fluid received by impeller blade 15 on the backward movement side thereof. As described above, the area of stopper part 15b is that which receives fluid resistance at the backward movement side of impeller blade 15. By not only shortening the length of stopper part 15b, but also by reducing the area of stopper part 15b by forming a notch section 15b1 thereupon, fluid resistance can be even further reduced at the backward movement side of impeller blade 15.

A third embodiment of the inventive water wheel impeller type power generator will now be explained in reference to FIG. 5. As with the above-described embodiment, this third embodiment aims to reduce fluid resistance at the backward movement side of impeller blade 15. In this third embodiment, a pillow member 35 is fixed onto impeller blade mounting surface 10a such as to create a gap between fluid receiving part 15a and impeller blade mounting surface 10a. By doing so, stopper part 15b is inclined at the backward movement side of impeller blade 15 when impeller blade 15 is pushed down, thus slightly reducing fluid resistance. In this case, pillow member 35 is provided in a position at which it will not block impeller blade erecting passage pipe 30. This alleviation of fluid resistance is even more effective when combining the present embodiment with the above-described second embodiment, that is, by providing notch section 15b1 on stopper part 15b and also providing a pillow member 35.

Further, the following effect can be achieved by virtue of the configuration of the present embodiment in which a gap is formed between blade mounting surface 10a of rotor 10 and fluid receiving part 15a of impeller blade 15 and fluid receiving part 15a is slightly upstanding. In FIG. 2, impeller blade 152 moving from impeller blade frame passage to fluid passage 20 is slightly erected by pillow member 35 shown in FIG. 5, thus, as is explained in the first embodiment, fluid coming into contact with fluid receiving part 15a of impeller blade 151, accelerated by impeller blade erecting passage pipe 301, and sprayed from other end 30 serves to erect fluid receiving part 15a of impeller blade 152, hence surely erecting fluid receiving part 15a to a greater extent than is achieved in the first embodiment.

Figure 6:
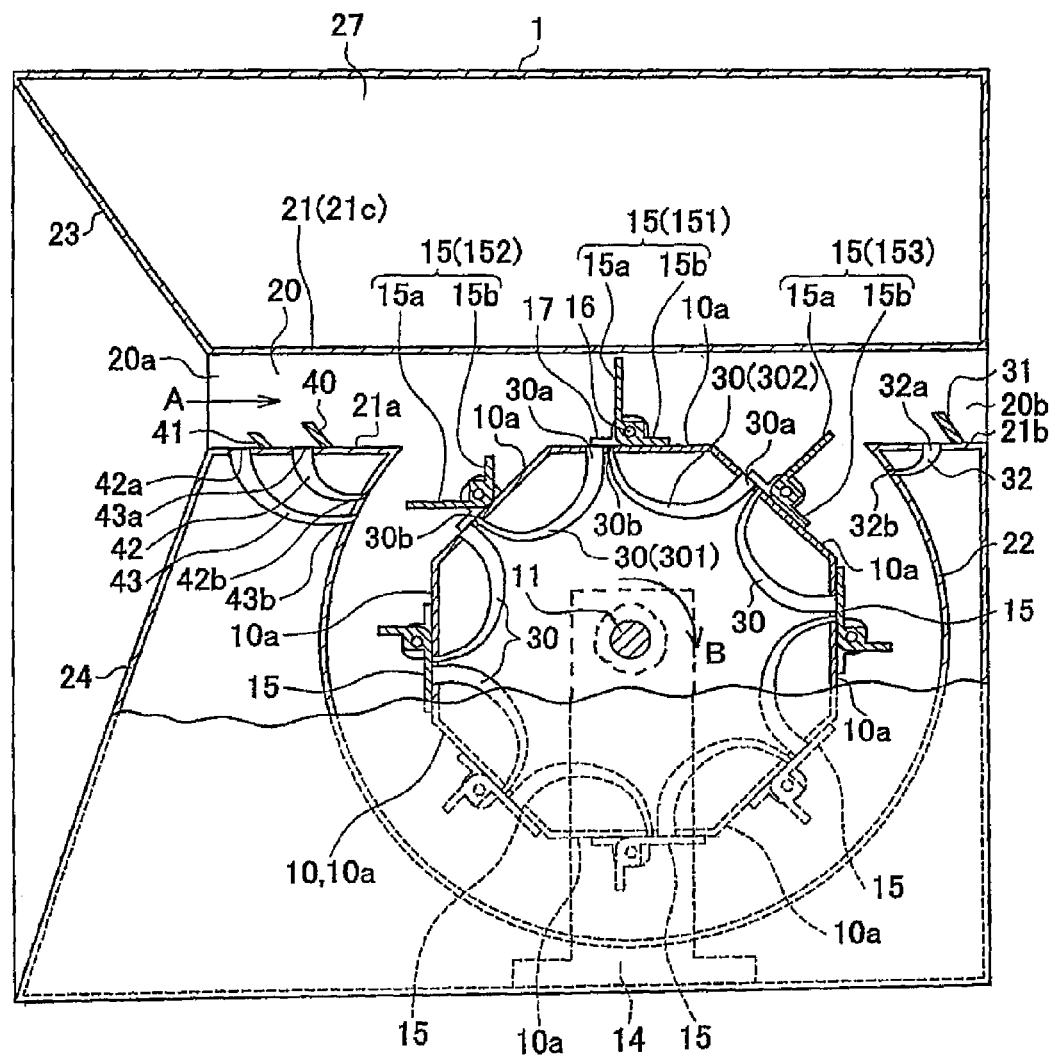
FIG. 6 is a side view of the fourth embodiment of the inventive water wheel impeller blade type power generator displayed as a partial cross-sectional view.

A fourth embodiment of the inventive water wheel impeller type power generator will now be explained in reference to FIG. 6. This fourth embodiment actualizes to an even further extent the sure erection of impeller blade 152 moving from impeller blade passage frame body 22 and into fluid passage 20 described in the first embodiment (FIG. 1 through FIG. 3). As such, members and components identical to those in the first embodiment shall be assigned the same numerals used therein.

Inclined plates 40, 41 sloping to the flow direction A side are uniformly spaced and fixed above lower plate 21a on the inlet 20a side of fluid passage frame body 21, and impeller blade erecting passage pipes 42, 43 are fixed from lower plate 21a on the fluid receiving side of inclined plates 40, 41 to impeller blade passage frame body 22 in a similar fashion as impeller blade downward passage pipe 32. Impeller blade erecting passage pipes 42, 43 are formed into a trumpet-shaped circular cross-section such that one end 42a, 43a of each pipe is formed with a larger diameter than the other end 42b, 43b of each pipe. That is, a nozzle-shaped flow passage is created from one end 42a to the other end 42b, and from one end 43a to the other end 43b.

In the case of the present embodiment, fluid flowing through fluid passage 20 comes into contact with inclined plates 40, 41, flows into one end 42a, 43a of impeller blade erecting passage pipes 42, 43, thereby accelerating the fluid, and thus causing it to flow out from the other end 42b, 43b and into impeller blade passage frame body 22. Rotor 10 is thereby rotated, causing impeller blade 152 to take a position corresponding to other end 42b, 43b, at which point the fluid accelerated by impeller blade erecting passage pipes 42, 43 is received by fluid receiving part 15a of impeller blade 152, thus causing fluid receiving part 15a to be erected.

The present embodiment was explained above in terms of applying it to the first embodiment (FIG. 1 through FIG. 3), but inclined plates 40, 41 and impeller blade erecting passage pipes 42, 43 may alone be provided, without providing impeller blade erecting passage pipe 30. However, as is the case with the present embodiment, when impeller blade erecting passage pipe 30 is provided along with inclined plates 40, 41 and impeller blade erecting passage pipes 42, 43, it is possible to surely erect impeller blade 15 through the synergetic effect between impeller blade erecting passage pipe 30 on the one hand and inclined plates 40, 41 and impeller blade erecting passage pipes 42, 43 on the other hand. In the case that inclined plates 40, 41 and impeller blade erecting passage pipes 42, 43 alone are provided without providing impeller blade erecting passage pipe 30, impeller blade 15 may not be erected if a gap is not formed between fluid receiving part 15a and impeller blade mounting surface 10a. This is resolved, however, by providing pillow member 35, as is done in the third embodiment (FIG. 5). It should be noted, though, that in the present embodiment, two groups of inclined plates 40, 41 and impeller blade erecting passage pipes 42, 43 are provided, but a single group combining inclined plate 40 and impeller blade erecting passage pipe 42 may also be provided and, further, three or more groups combining inclined plates and impeller blade erecting passage pipes may also be provided.

A fifth embodiment of the inventive water wheel impeller type power generator will now be explained in reference to FIG. 7. In this fifth embodiment, an impeller blade erecting passage pipe 44 is provided instead of the inclined plates 40, 41 and impeller blade erecting passage pipes 42, 43 described in embodiment 4 (FIG. 6) above. Impeller blade erecting passage pipe 44 is provided such as to slope upward from the upper portion of lower fluid guide plate 24 to impeller blade passage frame body 22 and is formed into a trumpet-shaped circular cross-section such that one end 44a is formed with a larger diameter than the other end 44b. That is, impeller blade erecting passage pipe 44 is formed into a nozzle-shaped flow passage running from one end 44a to the other end 44b.

In the case of the present embodiment, fluid flows into one end 44a of impeller blade erecting passage pipe 44, thereby being accelerated, flows out from the other end 44b, and then flows into impeller blade passage frame body 22. Rotor 10 is thereby rotated, causing impeller blade 152 to take a position corresponding to other end 44b, at which point the fluid accelerated by impeller blade erecting passage pipe 44 is received by fluid receiving part 15a of impeller blade 152, thus causing fluid receiving part 15a to be erected. In the present embodiment, as with the previous embodiments above, impeller blade erecting passage pipe 30 does not necessarily need to be provided. However, providing impeller blade erecting passage pipe 30 together with impeller blade erecting passage pipe 44 allows impeller blade 15 to be erected surely to an even further extent due to the resulting synergetic effect of the two components.

Figure 8:
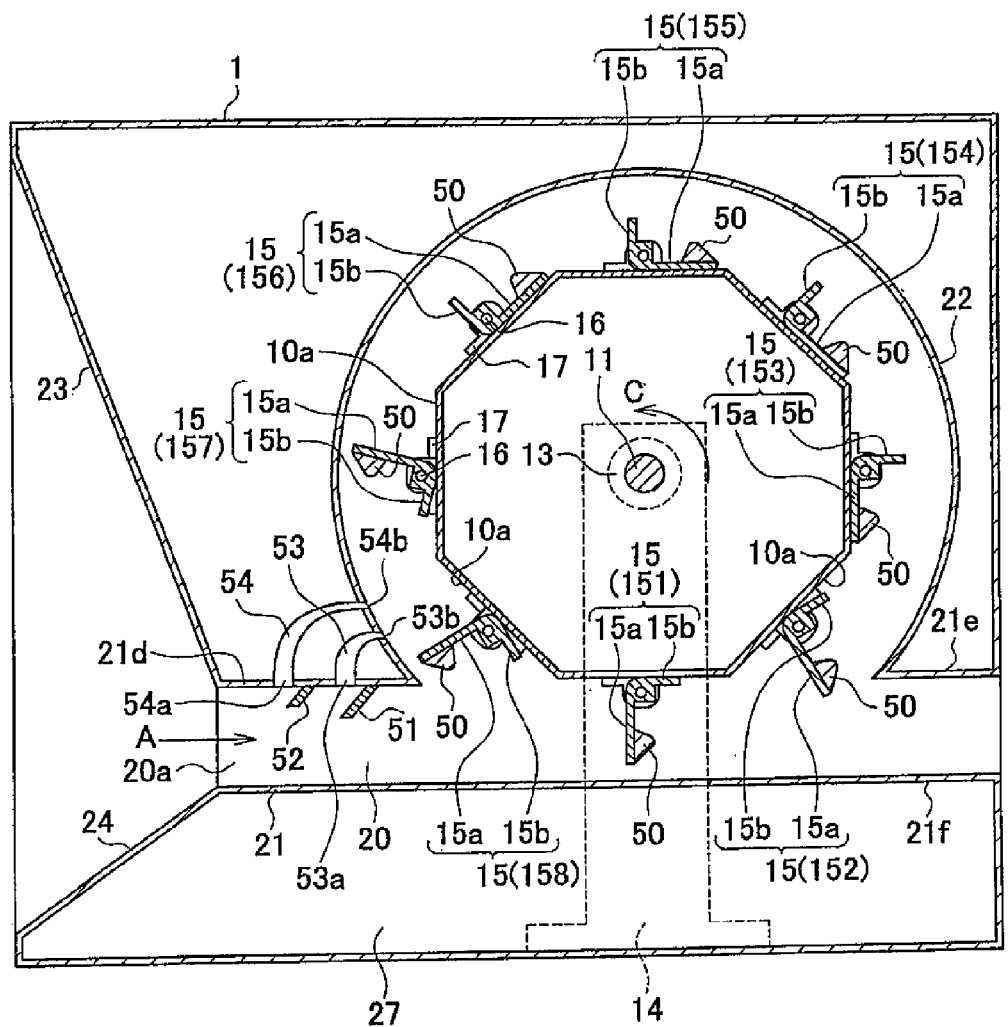
FIG. 8 is a schematic side cross-sectional view of the sixth embodiment of the inventive water wheel impeller blade type power generator.

A sixth embodiment of the inventive water wheel impeller type power generator will now be explained in reference to FIG. 8. The same numerals shall be used for components identical or corresponding to any of the above embodiments. In each of the above embodiments, is provided above fluid passage 20. In the present embodiment, though, rotor 10 is provided above fluid passage 20.

Rotor 10 is fixed to rotating shaft 11, and rotating shaft 11 is connected to input shaft 2a of generator 2 via joint 12. Rotating shaft 11 is rotatably supported by support plate 14 via bearing 13, and support plate 14 is fixed onto the bottom plate of device frame body 1. L-shaped impeller blade 15 comprising fluid receiving part 15a and stopper part 15b is disposed on impeller blade mounting surface 10a on the outer periphery of rotor 10, and a support shaft 16 is fixed onto impeller blade 15. Both end portions of support shaft 16 are rotatably supported by a bearing 17, and bearing 17 is fixed onto impeller blade mounting surface 10a. Here, impeller blade 15 is disposed such that fluid receiving part 15a receives flowing water or the like and, more specifically, moves in a flow direction A. A weight is fixed to the distal end of the surface opposite the fluid receiving side of fluid receiving part 15a.

Fluid passage frame body 21 excepting the rotating portion of impeller blade 15 is fixed to device frame body 1 such that fluid passage 20 is formed below rotor 10. Further, above fluid passage 20, the lower end of impeller blade frame body 22 is fixed to upper plates 21e, 21e of fluid passage frame body 21 and surrounds the outer periphery of rotor 10 to avoid inhibiting the rotation of impeller blade 15. Upper and lower fluid guide plates 23, 24 and left and right fluid guide plates sloping toward the outside from inlet 20a (not shown in the figure) are fixed onto device frame body 1 and fluid passage frame body 21 such that fluid may vigorously flow into inlet 20a of fluid passage 20. At this point, air chamber 27 is formed by lower plate 21f of fluid passage frame body 21, lower fluid guide plate 24, and device frame body 1. This air chamber 27 serves as a buoyant body and, as such, is preferable in the case that device frame body 1 is installed in a mid-position of a river, sea, or the like. Of course, it is not necessary for air chamber 27 to be formed in the case that device frame body 1 is installed at the bottom of a river, sea, or the like.

Inclined plates 51, 52 sloping to the flow direction A side are uniformly spaced and fixed to upper plate 21d on the inlet 20a side of fluid passage frame body 21, and impeller blade erecting passage pipes 53, 54 are fixed from upper plate 21d on the fluid receiving side of inclined plates 51, 52 to impeller blade passage frame body 22. Impeller blade erecting passage pipes 53, 54 are formed into trumpet-shaped circular cross-sections such that one end 53a, 54a of each pipe is formed with a larger diameter than the other end 53b, 54b of each pipe. That is, a nozzle-shaped flow passage is created from one end 53a to the other end 53b, and from one end 54a to the other end 54b.

The action of this embodiment will hereinafter be explained. Fluid flowing in the direction indicated by arrow A is received by fluid receiving part 15a corresponding to impeller blade 15 (151) positioned in fluid passage 20, thereby rotating rotor 10 in the direction indicated by arrow C. Impeller blade 15 (152) entering impeller blade passage frame body 22 from fluid passage 20 is then destabilized by fluid pressure flowing through fluid passage 20 and fluid pressure inside impeller blade passage frame body 22 which is exerted onto fluid receiving part 15a of impeller blade 15 (152). However, once completely inside of impeller blade passage frame body 22, impeller blade 15 (153, 154, 155, 156) is pushed down such that fluid receiving part 15a is brought into contact with impeller blade mounting surface 10a by fluid pressure in impeller blade passage frame body 22 generated by the rotation of rotor 10 and by weight 50. By doing so, resistance to fluid is reduced on the backward movement side of impeller blade 15.

When impeller blade 15 is positioned in the position indicated by numeral 157, this impeller blade 15 (157) can be rotated. That is, impeller blade 15 (157) is destabilized, but fluid receiving part 15a of impeller blade 15 (157) floats up from impeller blade mounting surface 10a through the balance between weight 50 and the fluid pressure impeller blade passage frame body 22. At this point, fluid flowing through fluid passage 20 comes into contact with inclined plates 51, 52, flows into one end 53a, 54a of impeller blade erecting passage pipes 53, 54, thereby accelerating the fluid, and thus causing to flow out from each of the other ends 53b, 54b and into impeller blade passage frame body 22. Rotor 10 is thereby rotated, causing impeller blade 157 to take a position corresponding to other end 53b, 54b, at which point the fluid accelerated by impeller blade erecting passage pipes 53, 54 is received by fluid receiving part 15a of impeller blade 157, along with which fluid receiving part 15a is erected by weight 50, thus moving the water wheel to the state of impeller blade 15 (158).

In this way, because fluid passage 20 is formed below rotor 10, which is provided with impeller blade 15, fluid receiving part 15a falls down when impeller blade 15 moves from fluid passage 20 into impeller blade passage frame body 22. That is, resistance is reduced on the backward movement side of impeller blade 15. Further, impeller blade 15 moving from fluid passage 20 into impeller blade passage frame body 22 is erected via the gravitational force of weight 50 provided on fluid receiving part 15a. In this case, providing impeller blade erecting passage pipes 53, 54 allows fluid to be vigorously sprayed onto impeller blade 15 moving from fluid passage 20 into impeller blade passage frame body 22, thereby surely erecting impeller blade 15 to an even further extent than in previous embodiments.

In the present embodiment, because fluid receiving part 15a of impeller blade 15 is provided with weight 50, impeller blade 15 moving from fluid passage 20 into impeller blade passage frame body 22 hangs down due to the gravitational force of weight 50. As such, impeller blade 15 can be erected without providing impeller blade erecting passage pipes 53, 54, but, as is explained above, providing impeller blade erecting passage pipes 53, 54 allows impeller blade 15 to be surely erected to an even further extent. It should be noted, though, that in the present embodiment, two groups of inclined plates 51, 52 and impeller blade erecting passage pipes 53, 54 are provided, but a single group combining inclined plate 51 and impeller blade erecting passage pipe 53 may also be provided and, further, three or more groups combining inclined plates and impeller blade erecting passage pipes may also be provided.

Figure 2:
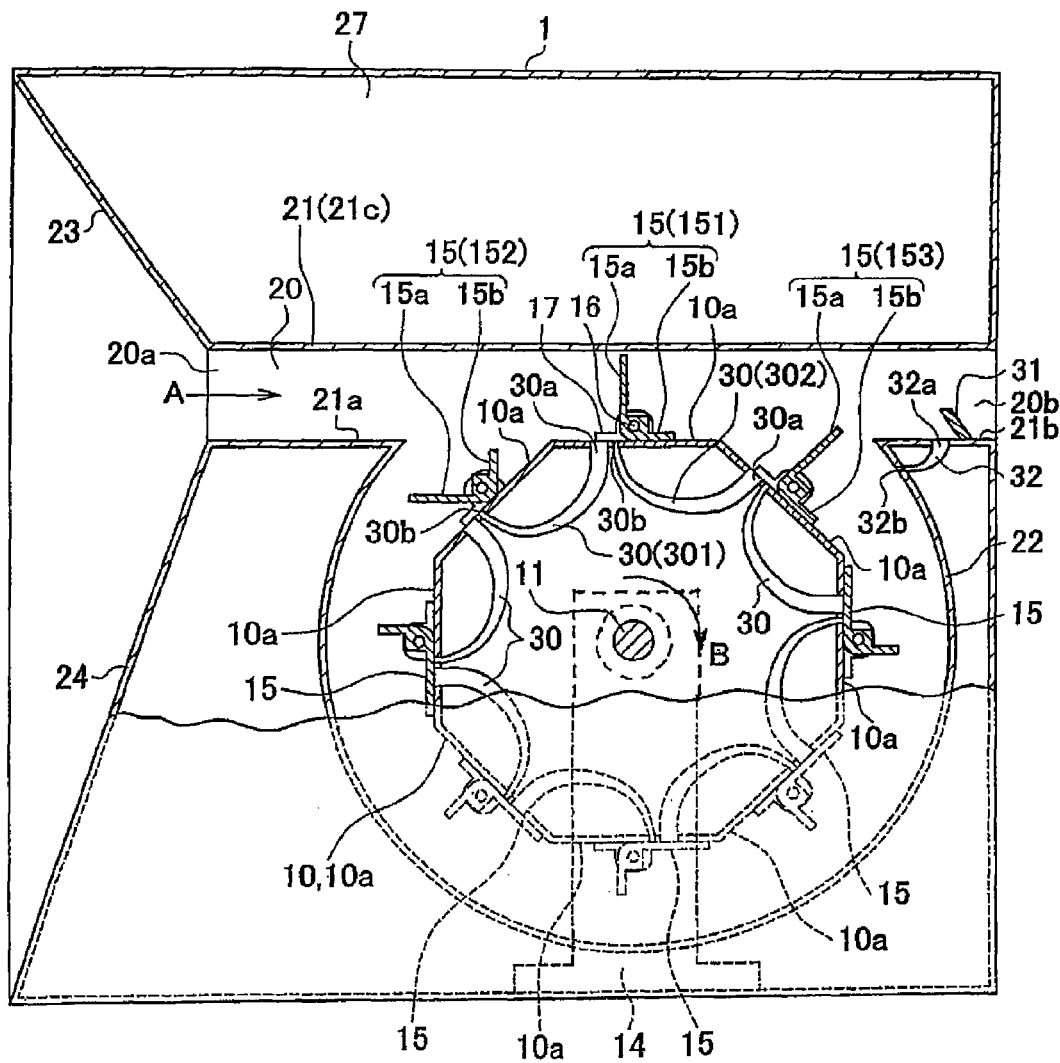
FIG. 2 is a side view displayed as a partial cross-sectional view.
Figures 3, 4A, 4B, 4C, 5A, 5B:
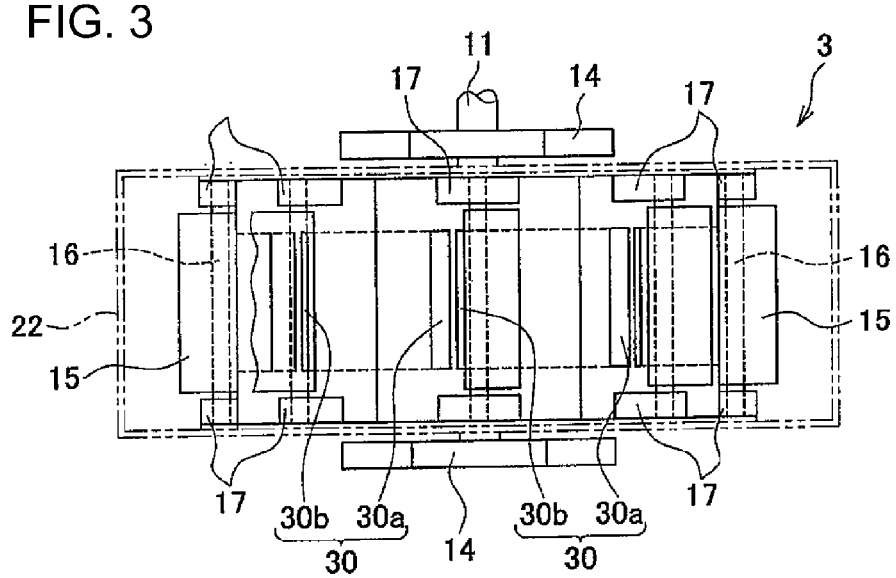
FIG. 3 is a plane view of the rotor portion.

In the above embodiments, impeller blade 15 can be reduced in weight by providing rotor 10 below fluid passage 20 as shown in FIG. 2 (first embodiment), FIG. 6 (sixth embodiment), and FIG. 7 (fifth embodiment), thus allowing for high speed rotation of the water wheel. On the other hand, the impeller blade 15 can be considerably increased in weight with weight 50 when rotor 10 is provided above fluid passage 20 as shown in FIG. 8 (sixth embodiment), a configuration suitable for low speed rotation in consideration of the fact that high speed rotation prevents the falling of the impeller blade due to centrifugal force.

A seventh embodiment of the inventive water wheel impeller type power generator will now be explained in reference to FIG. 9 through FIG. 11. This seventh embodiment is expressed in terms of being applied to the fifth embodiment (FIG. 7) above. It should be noted that members and components identical to those in each of the above embodiments shall be assigned the same numerals used therein. In all of the above embodiments, it is preferable for the source of the fluid to be a river flowing in a single direction. However, in the case of the sea, water direction changes according to the low tide and high tide of seawater. Installing the water wheel impeller blade type power generator of the above embodiments in this type of environment will decrease its working ratio. As such, the object of the present embodiment is to provide a water wheel impeller blade type power generator capable of surely generating power during both a high tide and a low tide.

A fluid passage 200 is formed below rotor 10 in the same way as the aforementioned fluid passage 20. When seawater flows from the left side to the right side of the upper fluid passage 20 as indicated by arrow A in FIG. 9, this seawater comes into contact with fluid receiving part 15a of impeller blade 15, thereby causing rotor 10 to rotate in the direction indicated by arrow B. When seawater flows from the right side to the left side of the lower fluid passage 200 as indicated by arrow A' in FIG. 10, this seawater comes into contact with fluid receiving part 15a of impeller blade 15, thereby causing rotor 10 to rotate in the direction indicated by arrow B.

Upper and lower fluid guide plates 230, 240 and left and right fluid guide plates 250 and 260 sloping toward the outside from inlet an 200a are fixed to device frame body 1 and fluid passage frame body 210 such that fluid may vigorously flow into inlet 200a of fluid passage 200. At this point, an air chamber 27 is formed by a lower plate 210c of fluid passage frame body 210, lower fluid guide plate 240, and by device frame body 1.

Inclined plate 310 sloping to the flow direction A' side is fixed above upper plate 210b on the outlet 200b side of fluid passage frame body 210, and an impeller blade downward passage pipe 320 is fixed from upper plate 210b on the fluid receiving side of inclined plate 310 to impeller blade passage frame body 22. Impeller blade downward passage pipe 320 is formed into a trumpet-shaped circular cross-section such as is done with impeller plate downward passage pipe 32 above, such that one end 320a is formed with a larger diameter than the other end 320b. That is, a nozzle-shaped flow passage is created from one end 320a to the other end 320b.

Additionally, impeller blade erecting passage pipe 440 sloping downward from the upper portion of upper fluid guide plate 230 to impeller blade passage frame body 22 is provided on the inlet 200a side of fluid passage 200. Impeller blade erecting passage pipe 440 is formed into a trumpet-shaped circular cross-section such that one end 440a is formed with a larger diameter than the other end 440b. That is, a nozzle-shaped flow passage is created from one end 440a to the other end 440b.

Support blocks 60, 60 are fixed to the portion of upper fluid guide plate 23 above outlet 20b of fluid passage 20 in areas separated from the width of fluid passage 20, as shown in FIG.

9, FIG. 10, and FIG. 11(a), such that seawater does not flow to fluid passage 20 when seawater flows in the direction indicated by arrow A', with both end portions of a support shaft 61 being fixed to each of the support blocks 60, 60 respectively. A fluid inflow prevention plate 62 is then rotatably supported by support shaft 61 in order to cover outlet 20b.

Figure 9:
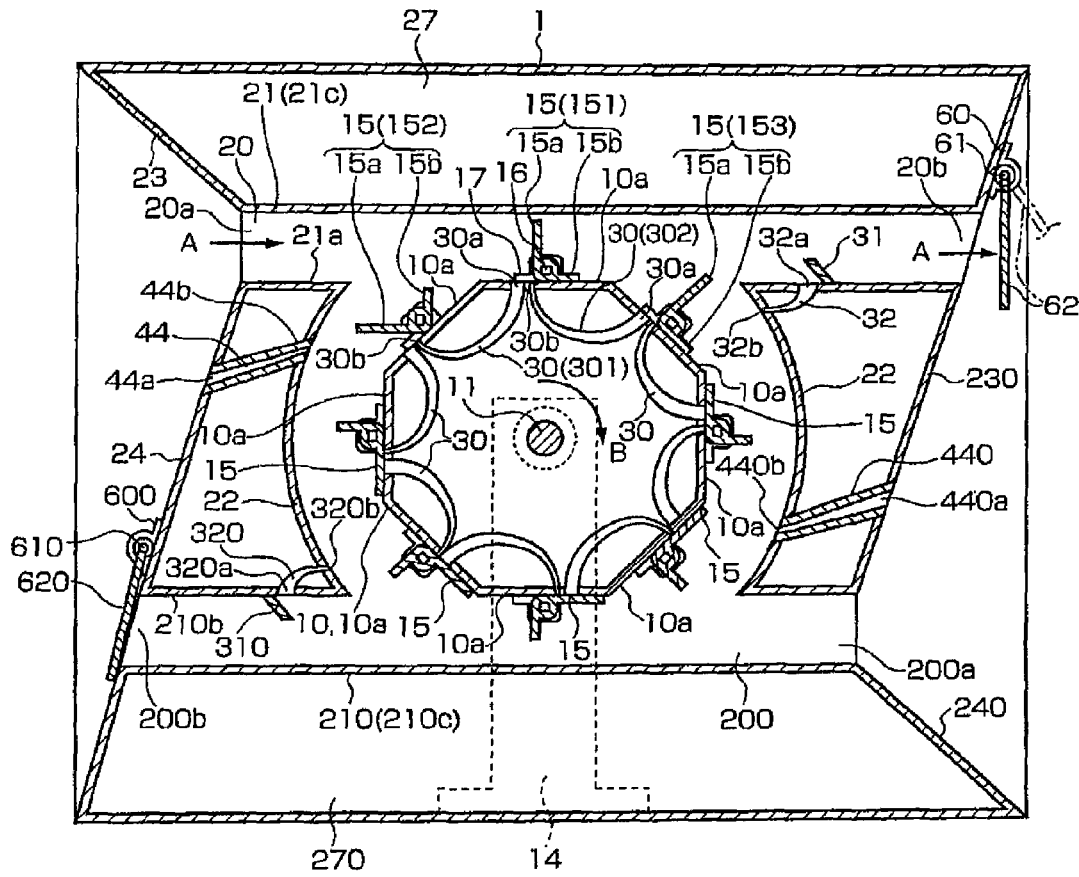
FIG. 9 is a schematic side cross-sectional view of the seventh embodiment of the inventive water wheel impeller blade type power generator.

Similarly, Support blocks 600, 600 are fixed to the portion of left and right fluid guide plates 250, 260 above outlet 200b of fluid passage 200 in areas separated from the width of fluid passage 200, as shown in FIG. 9, FIG. 10, and FIG. 11(b), such that seawater does not flow to fluid passage 200 when seawater flows in the direction indicated by arrow A, with both end portions of a support shaft 610 being fixed to each of the support blocks 600, 600 respectively. A fluid inflow prevention plate 620 is then rotatably supported by support shaft 610 in order to cover outlet 200b.

The action of the above-described configuration will hereafter be explained. When seawater flows in the direction indicated by arrow A, fluid flows to fluid passage 20, as shown in FIG. 9, thus rotating shaft 11 along with rotor 10 as is explained above, thereby generating power via generator 2. In this case, seawater flowing through fluid passage 20 in the direction indicated by arrow A causes fluid inflow prevention plate 62 to rotate about support shaft 61 as shown by the two-dot chain line. Additionally, fluid inflow prevention plate 62 is pressed by seawater flowing in the direction indicated by arrow A, thereby obstructing outlet 200b of fluid passage 200. As a result, seawater is prevented from flowing into fluid passage 200, thus preventing any negative influence on impeller blade 15.

When, as shown in FIG. 10, the flow of seawater changes to the A' direction due to a high tide or low tide, fluid inflow prevention plate 62 is pressed by seawater flowing in the direction indicated by arrow A', thereby obstructing outlet 20b of fluid passage 20. As a result, seawater is prevented from flowing into fluid passage 20, thus preventing any negative influence on impeller blade 15. When seawater flows into fluid passage 200 from the arrow A' direction, rotor 10 is rotated by the same action occurring when seawater flows into fluid passage 20 from the arrow A direction.

This action will hereafter be explained. Here, impeller 15 positioned in fluid passage 200 will be indicated by the numeral 151, the impeller blade 15 behind this impeller blade 151 will be indicated by the numeral 152, and the impeller blade 15 in front of this impeller blade 151 will be indicated by the numeral 153. Additionally, impeller blade erecting passage pipe 30 extending from impeller blade mounting surface 10a of impeller blade 151 to impeller blade mounting surface 10a of impeller blade 152 will be explained as numeral 301, while impeller blade erecting passage pipe 30 extending from impeller blade mounting surface 10a of impeller blade 153 to impeller blade mounting surface 10a of impeller blade 151 will be explained as numeral 302. Furthermore, impeller blade 15 will be explained according to the configuration shown in FIG. 10.

Flow rate of the fluid is accelerated by upper and lower fluid guide plates 230, 240 and by left and right fluid guide plates 250, 260, thereby allowing the fluid to flow into inlet 200a of fluid passage 200. Impeller 151 is then rotated in the direction of arrow B by means of fluid flowing in the direction of arrow A. Furthermore, A portion of the fluid coming into contact with fluid receiving part 15a of impeller blade 151 flows into impeller blade erecting passage pipes 301, 302.

Fluid flowing through one end 30a of impeller blade erecting passage pipe 301 is accelerated by the nozzle shape of impeller blade erecting passage pipe 301, whereafter this fluid is sprayed from the other end 32b onto fluid receiving part 15a of impeller blade 152, thereby erecting impeller blade 152. When impeller 152 becomes positioned within fluid passage 200 in an even slightly erected state, impeller blade 152 is completely erected until stopper part 15b abuts impeller blade mounting surface 10a via fluid flowing through fluid passage 200. Additionally, fluid also flows into the other end 30b of impeller blade passage pipe 302, but because this other end 30b is smaller in diameter than one end 30a, fluid flowing into the other end 30b is decelerated, thus preventing impeller blade 153 from being influenced.

Furthermore, fluid flowing through fluid passage 200 comes into contact with inclined plate 310, flows into one end 320a of impeller blade downward passage pipe 320, thereby accelerating the fluid, and thus causing it to flow out from the other end 320b and into impeller blade passage frame body 22. Rotor 10 is thereby rotated, causing impeller blade 153 to take a position corresponding to other end 320b, at which point the fluid accelerated by impeller blade downward passage pipe 320 is received by fluid receiving part 15a of impeller blade 153, thus causing fluid receiving part 15a to move downward.

Moreover, with the present embodiment, fluid flows into one end 440a of impeller blade erecting passage pipe 440, thereby accelerating the fluid, and thus causing it to flow out from the other end 440b and into impeller blade passage frame body 22. Rotor 10 is thereby rotated, causing impeller blade 152 to take a position corresponding to other end 440b, at which point the fluid accelerated by impeller blade erecting passage pipe 440 is received by fluid receiving part 15a of impeller blade 152, thus causing fluid receiving part 15a to be erected. In the present embodiment, as with the previous embodiments above, impeller blade erecting passage pipe 30 does not necessarily need to be provided. However, providing impeller blade erecting passage pipe 30 together with impeller blade erecting passage pipe 440 allows impeller blade 15 to be erected surely to an even further extent due to the resulting synergetic effect of the two components.

An eight embodiment of the inventive water wheel impeller type power generator will now be explained in reference to FIG. 9 through FIG. 12. The inventive water wheel impeller type power generator may be fixed and installed to the bottom of a river or the bottom of the sea. However, the maintenance involved with this type of fixed generator is extremely difficult. Thus, it is preferable for the water wheel impeller type power generator to be installed at a mid-position in a river or sea, rather than fixing the generator to the bottom of a river or the bottom of the sea. In this case, wire fitting tools are provided on the four front corners and four back corners of the water wheel impeller type power generator, whereby two wires are horizontally installed and separated from one another at a fixed distance above the device, and two additional wires are horizontally installed and separated from one another at a fixed distance below the device. The water wheel impeller type power generator is then supported on wires by mounting the aforementioned upper two wires onto the upper wire fitting tools provided on the front and back of water wheel impeller type power generator, and by mounting the aforementioned lower two wires onto the lower wire fitting tools provided on the front and back of the water wheel impeller type power generator.

Figure 12:
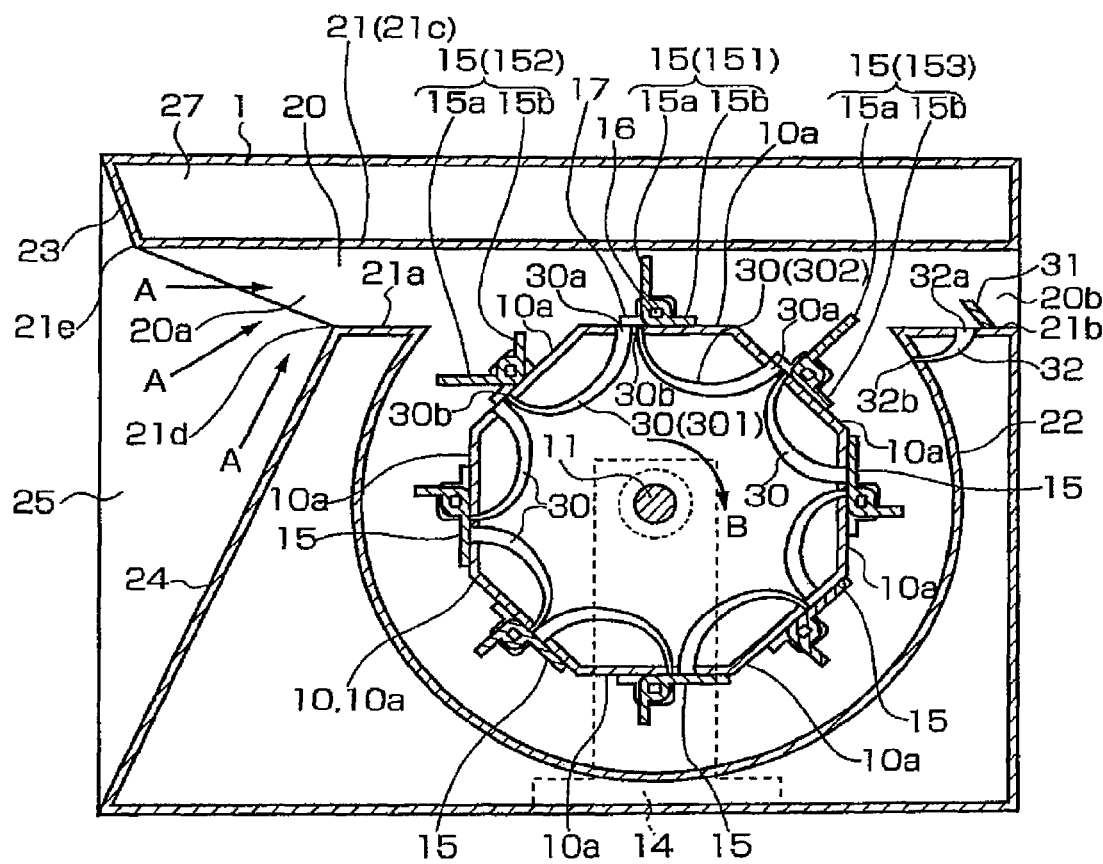
FIG. 12 is a schematic side cross-sectional view of the eighth and ninth embodiments of the inventive water wheel impeller blade type power generator.

In this way, in the case that the water wheel impeller type power generator is installed at a mid-position in a river or sea, when air chamber 27 is enlarged to make the water wheel impeller type power generator lighter as shown in, for example, FIG. 2, thus causing the center of gravity of the generator to shift to the lower portion relative to the height thereof. As such, the light portion of air chamber 27 is pushed by the flow of water, and, in case of FIG. 2, right rotational movement around the heavy portion of air chamber 27 may occur. In order to avoid this problem, the invention is configured in the present embodiment such that, as is shown in FIG. 12, the height of air chamber 27 is reduced and the center of gravity of the water wheel impeller type power generator is set at a position corresponding to approximately half the height thereof. While this eighth embodiment is expressed in terms of being applied to the first embodiment (FIG. 2) above, it may also be applied to the third embodiment (FIG. 6) and/or fourth embodiment (FIG. 7).

A ninth embodiment of the inventive water wheel impeller type power generator will now be explained in reference to FIG. 9 through FIG. 12. Above, for example in the first embodiment (FIG. 1-FIG. 5), upper and lower fluid guide plates 23, 24 and left and right fluid guide plates 25, 26 are on the same vertical plane. Fluids guided by upper and lower fluid guide plates 23, 24 and left and right fluid guide plates 25, 26 are uniformly accelerated by inlet 20a, whereafter these fluids collide with one another, resulting in pressure loss and, thereby, creating a turbulent flow, thereby disallowing the fluid to flow smoothly into fluid passage 20. This phenomenon also takes place in the case of embodiments 2 through 4.

A front end portion 21d of lower plate 21a of inlet 20a of fluid passage 20 (fluid passage frame body 21) is formed behind a front end portion 21e of upper plate 21c of inlet 20a. By doing so, the four end portions of inlet 20a are made to deviate from one another in position, thus bringing the lower portion of the front end portion of upper plate 21c into a closed state at inlet 20a and, as a result, preventing the collision of fluids flowing into inlet 20a. That is, flowing water accelerated by lower fluid guide plate 24 and by left and right fluid guide plates 25, 26 smoothly flows into fluid passage 20. Although the present embodiment was explained in terms of being applied to the first embodiment (FIG. 2), it may also be applied to embodiment 3 (FIG. 6) and/or embodiment 4 (FIG. 7).

Figure 13:
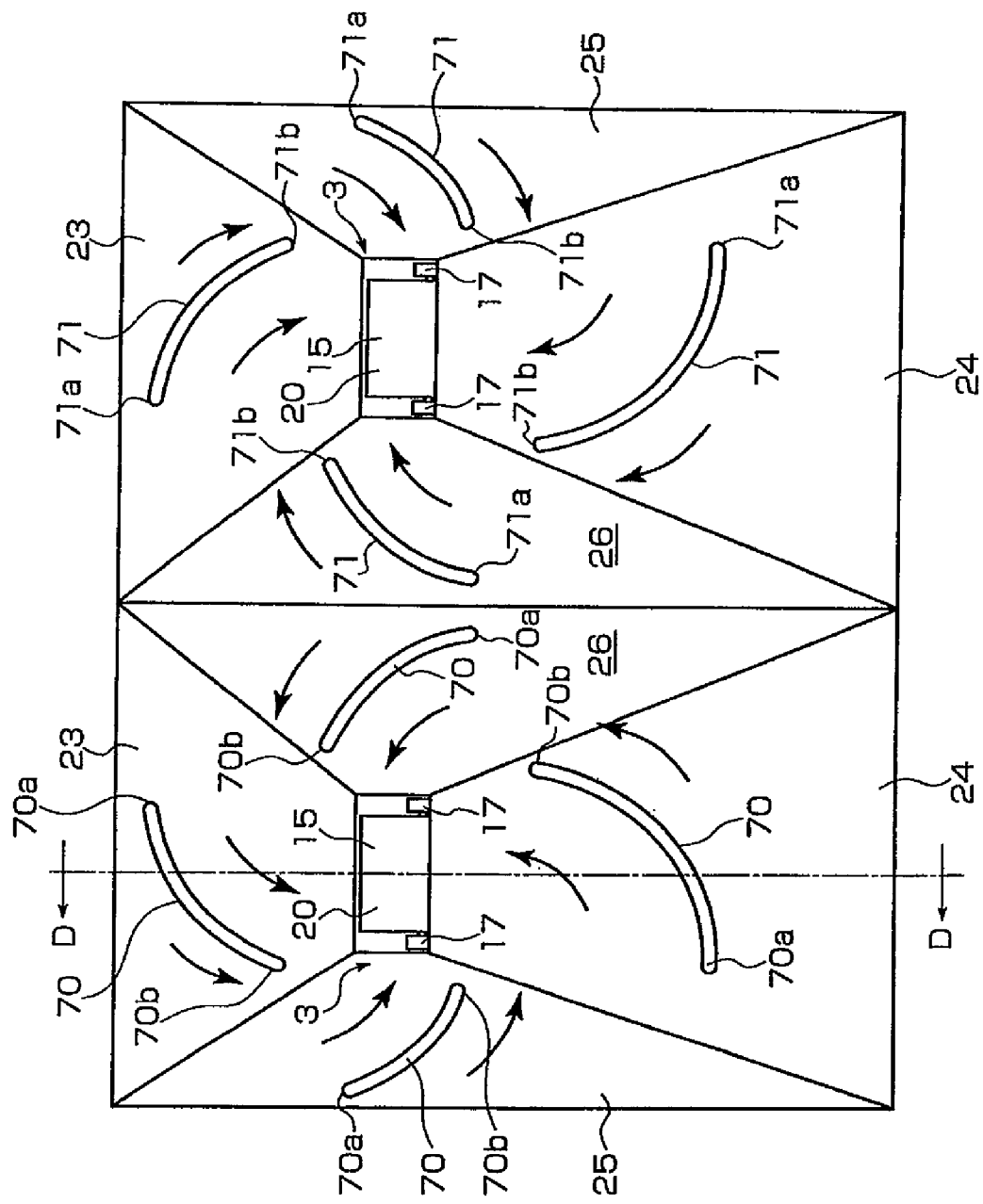
FIG. 13 is a schematic side cross-sectional view of the tenth embodiment of the inventive water wheel impeller blade type power generator.
Figure 14:
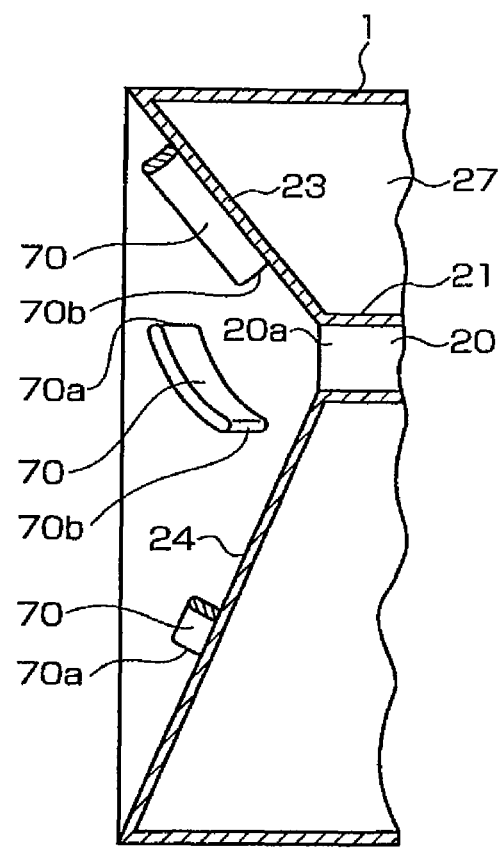
FIG. 14 is a cross-sectional view of the like D-D from FIG. 13 showing corresponding relevant components.

A tenth embodiment of the inventive water wheel impeller type power generator will now be explained in reference to FIG. 13 and FIG. 14. As with the ninth embodiment above, the present embodiment actualizes the smooth flowing of water into inlet 20a of fluid passage 20 (fluid passage frame body 21). As shown in FIG. 13, a plurality of fluid guide projections 70 are provided on the upper and lower fluid guide plates 23, 24 and left and right fluid guide plates 25, 26 corresponding to water wheel impeller blade type power generator 3 on the left side such that fluid accelerated by upper and lower fluid guide plates 23, 24 and left and right fluid guide plates 25, 26 generates a vortex and thereby flows into inlet 20a and such that this fluid is twisted in one direction (the left-rotating direction). That is, fluid guide projections 70 are formed such that one end thereof 70b draws near inlet 20a in the left-rotating direction from the other end thereof 70a which is separated from inlet 20a. This configuration thus allows fluid accelerated by upper and lower fluid guide plates 23, 24 and left and right fluid guide plates 25, 26 and flowing into inlet 20a to be guided by these four fluid guide projections 70 and generate a left-rotating vortex as indicated by the arrows in FIG. 13.

On the other hand, as shown in the FIG. 13, a plurality of fluid guide projections 71 are provided, in the same way as fluid guide projections 71 above, on the upper and lower fluid guide plates 23, 24 and left and right fluid guide plates 25, 26 corresponding to the water wheel impeller blade type power generator 3 on the right side. Here, fluid guide projections 71 are formed such that fluid accelerated by upper and lower fluid guide plates 23, 24 and left and right fluid guide plates 25, 26 generates a right-rotating vortex and thereby flows from inlet 20a and into fluid passage 20. That is, fluid guide projections 71 are formed such that one end thereof 71b draws near inlet 20a in the right-rotating direction from the other end thereof 71a which is separated from inlet 20a. This configuration thus allows fluid accelerated by upper and lower fluid guide plates 23, 24 and left and right fluid guide plates 25, 26 and flowing into inlet 20a to be guided by these four fluid guide projections 70 and generate a left-rotating vortex as indicated by the arrows in FIG. 13. Of course, fluid guide projections 71 may be formed exactly the same as fluid guide projections 70 such that fluid guide projections 71 generate a left-rotating vortex.

In each of the above-described embodiments, two water wheel impeller blade type power generators 3,3 are formed on either side of generator 2, but a single water wheel impeller blade type power generator 3 may instead be installed. However, as with the present embodiment, by installing two water wheel impeller blade type power generators 3,3 on either side of generator 2, suitable balance is actualized, thus making it preferable for the inventive device to be installed at a mid-position in water or in the sea.

Figure 15:
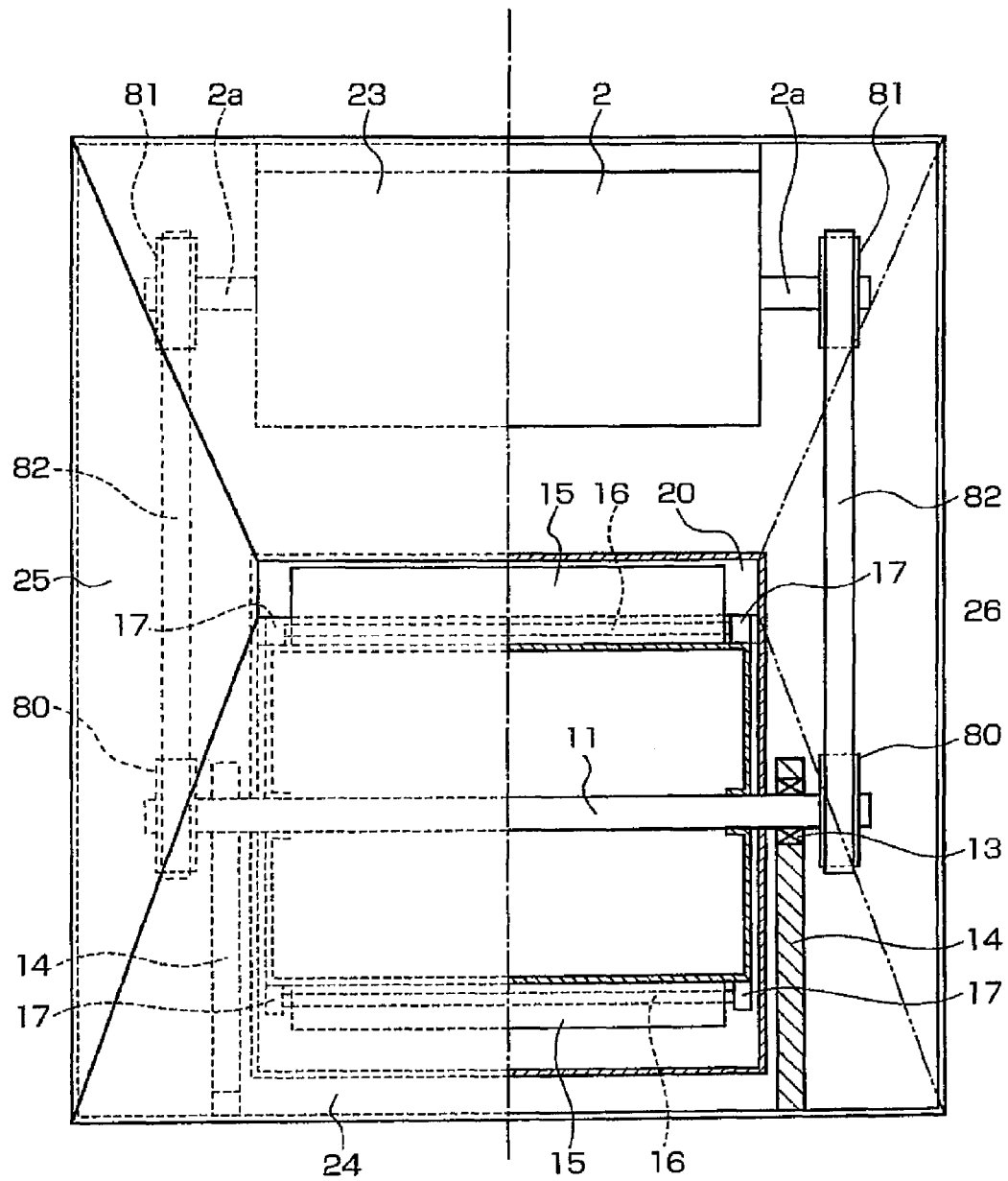
FIG. 15 is a front view of the eleventh embodiment of the inventive water wheel impeller blade type power generator with the right half shown as a cross-sectional view.
Figure 16:
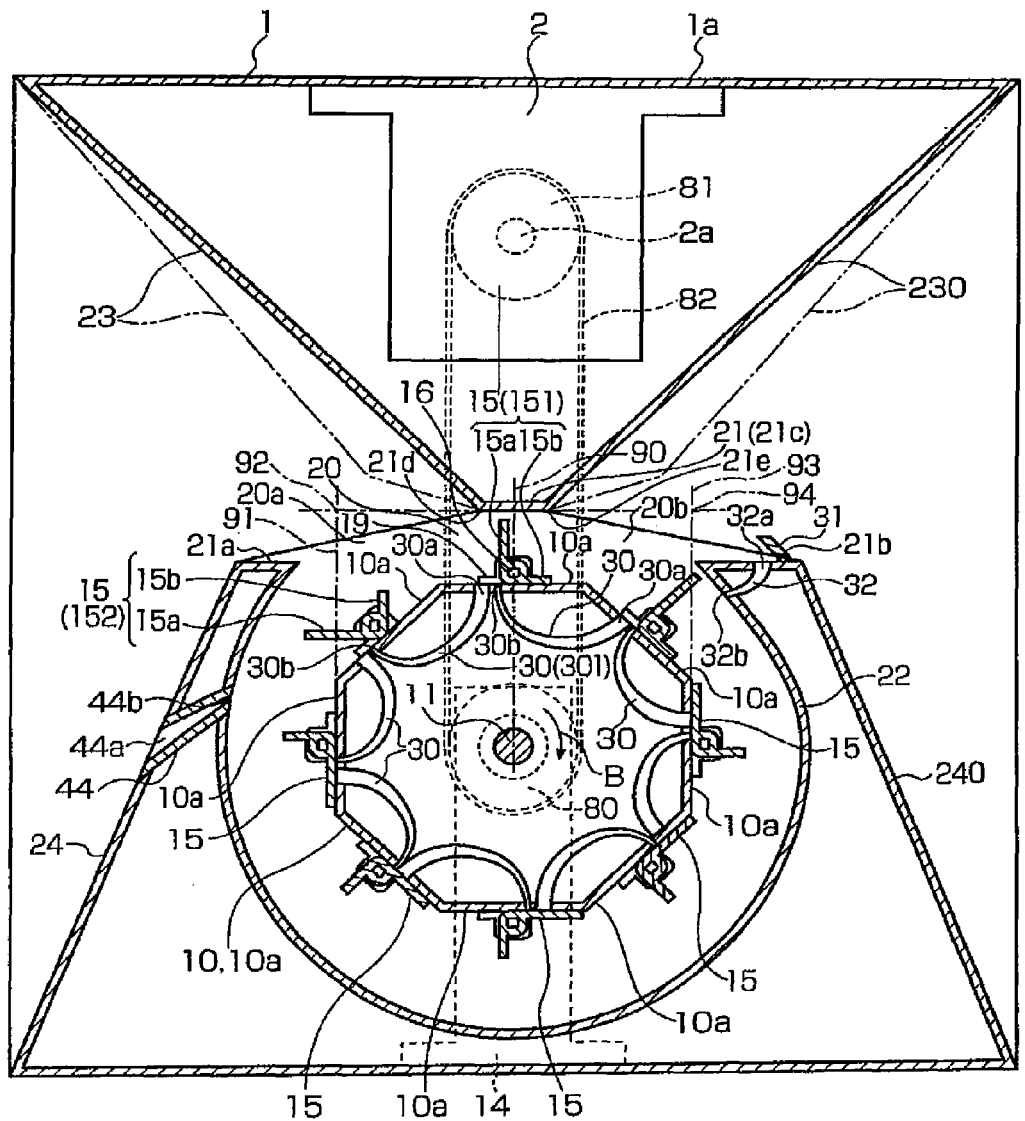
FIG. 16 is a schematic side cross-sectional view of FIG. 15.

An eleventh embodiment of the inventive water wheel impeller type power generator will now be explained in reference to FIG. 15 through FIG. 16. In each of the above embodiments, a configuration is provided in which fluid passage 20 (from inlet 20a to outlet 20b) is formed to be long. As such, fluid resistance is increased in fluid passage 20, thereby preventing fluid coming into contact with fluid guide plates 23, 24, 25, and 26 from surely flowing into inlet 20a of fluid passage 20, weakening the fluid pressure acting on fluid receiving part 15a of impeller blade 15 and, thus, potentially decreasing power generation efficiency. The object of the present embodiment, on the other hand, is to allow fluid to flow surely into fluid passage 20 and thereby improve power generation efficiency. In the present embodiment, members and components identical to those in the first embodiment shall be assigned the same numerals used therein. Further, as with the first embodiment, rotor 10 is provided with impeller blade 15 and impeller blade erecting passage pipe 30.

Although generator 2 is installed on the rotor 10 side as is done in the first embodiment, generator 2 is also fixed to a ceiling plate 1a of device frame body 1. Pulleys 80, 80 are fixed to both end portions of rotating shaft 11, and two more pulleys 81, 81 are fixed to input shafts 2a, 2a of generator 2 relative to pulleys 80, 80. Timing belts 82, 82 are then provided on pulleys 80, 80 and pulleys 81, 81.

In the present embodiment, rectangular shaped fluid passage 20 has a short length in front of and behind a vertical line 90 in the center of rotating shaft 90. Here, upper fluid guide plate 23 in front and upper fluid guide plate 230 in back are formed such as to slope towards the outside from front edge 21d and back edge 21e of upper plate 21c of fluid passage frame body 21 of fluid passage 20. Rather than being a single straight line-shaped inclined plate, upper fluid guide plates 23, 230 may be 2 or more gentle inclined plates, as indicated by the two-dot chain line and, further, the lower portions of these plates may be formed on a gentle curved surface.

As is described above, because upper plate 21c (front edge 21d and back edge 21e) of fluid passage frame body 21 is short in length, fluid thus flows into impeller blade passage frame body 22 via inlet 20a, thus potentially blocking the erection of impeller blade 15 (152) moving into fluid passage 20. Here, lower plates 21a, 21b of fluid passage frame body 21 are, in comparison to the previous embodiments, formed above the outer diameter of rotor 10. Further, front lower plate 21a is formed short in length such as to allow fluid to easily flow into inlet 20a, and lower fluid guide plate 24 is formed to face the outside from the front edge of lower plate 21a. Inclined plate 31 and impeller blade downward passage pipe 32 are provided on back lower plate 21b such as to perform the same action as that described in the first embodiment. Additionally, in order to create a pressure reducing part on the side of outlet 20b, back lower fluid guide plate 240 is formed to face the outside from the front edge of lower plate 21b, as is done with the aforementioned upper fluid guide plate 230.

Figure 7:
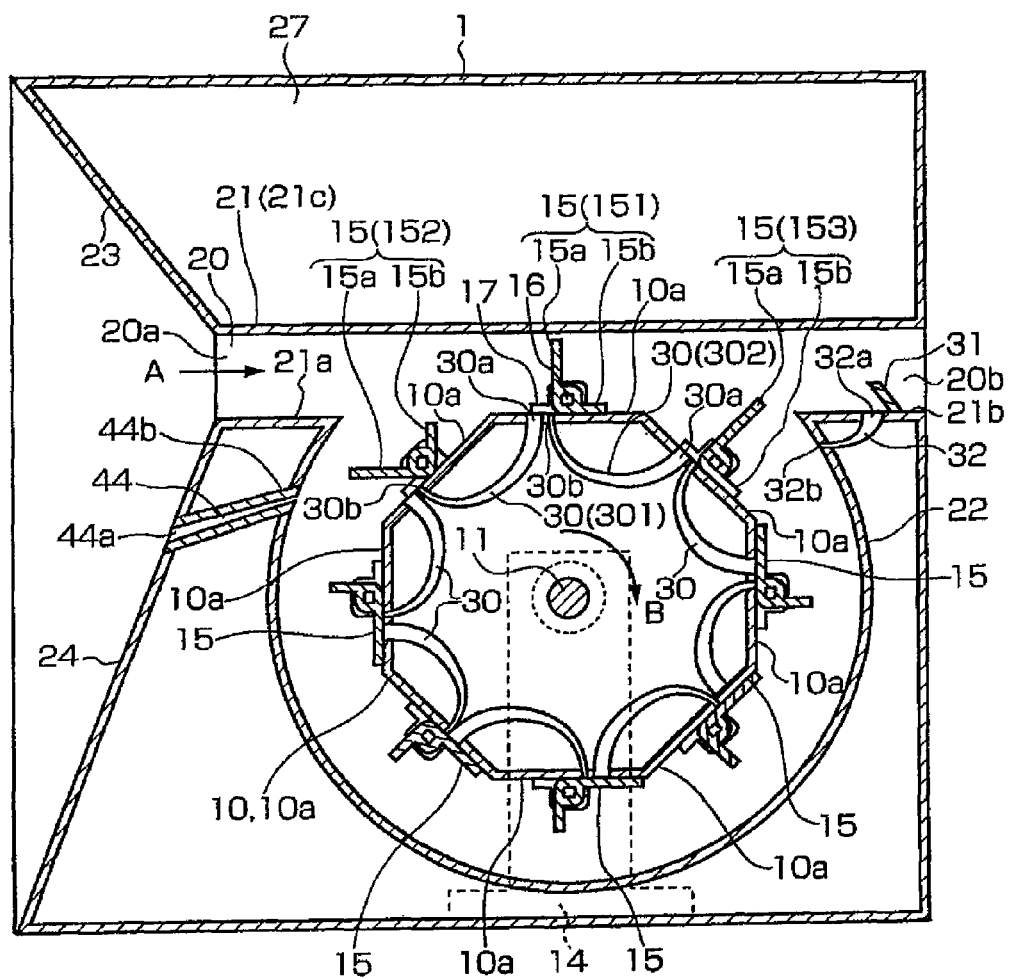
FIG. 7 is a schematic side cross-sectional view of the fifth embodiment of the inventive water wheel impeller blade type power generator.

Additionally, as with impeller blade erecting passage pipe 44 shown in FIG. 7, impeller blade erecting passage pipe 44 is provided such as to slope from the upper portion of lower fluid guide plate 24 and towards impeller blade passage frame body 22, forming impeller blade erecting passage pipe 44 into a trumpet-shaped circular cross-section such that one end 44a is formed with a larger diameter than the other end 44b. That is, a nozzle-shaped flow passage is created from one end 44a to the other end 44b.

In this way, fluid resistance is low because fluid passage 20 is very short from front edge 21d of the upper portion of rotating shaft 11 up to back edge 21e. As such, fluid coming into contact with fluid guide plates 23, 24, 25, and 26 efficiently flows into fluid passage 20, thus improving power generation efficiency. Further, by forming both upper fluid guide plate 230 and lower fluid guide plate 240 on the inclined plate, a pressure reducing part is created on the back side thereby generating a suction effect towards the fluid passage of the flowing fluid and, as a result, further improving generation efficiency.

In the present embodiment, front edge 21d and back edge 21e of upper plate 21c at fluid passage 20 is formed onto the upper portion of rotating shaft 11. However, front edge 21d may be the intersection 92 between the radial distance from vertical line 90 of rotating shaft 11 to the radial distance of rotor 10, that is the vertical line 91 of the front end portion of rotor 10, and the horizontal line of upper plate 21c. In the same way, back edge 21e may be the intersection 94 between the radial distance from vertical line 90 of rotating shaft 11 to the radial distance of rotor 10, that is the vertical line 93 of the front end portion of rotor 10, and the horizontal line of upper plate 21c Moreover, in each of the above embodiments, rotor 10 is described as an octahedron with eight impeller blades provided thereupon, but there is no specific limit to the number of impeller blades 15.

A twelfth embodiment of the inventive water wheel impeller type power generator will now be explained in reference to FIG. 17. This twelfth embodiment is a deformation example of the sixth embodiment (FIG. 8), wherein rotor 10 and impeller blade 15 are provided in different shapes. That is, fluid passage is provided below rotor 10, as is the case with the eighth embodiment. The same numerals shall be used for components identical or corresponding to the components shown in FIG. 8. Fluid receiving part 15a of impeller blade 15 is comprised of a bottom portion fluid receiving part 15a1 and a weight 15a2 fixed to the distal end thereof. There is no specific limitation on the material used to form weight 15a2 so long as it is heavier than fluid receiving part 15a1. For example, in the case that fluid receiving part 15a1 is comprised of a stainless material, a lead material will be used for weight 15a2. The side of the fluid receiving part is indented into an R shape such that fluid receiving part 15a may receive a large volume of water. The outer periphery of rotor 10 is formed such as to form a large arc-shaped outer diameter of outer part 10c of a part abutted by the distal end part of fluid receiving part 15a by part 10b of support shaft 16. Therefore, in the falling (folded) state of fluid receiving part 15a, because the distal end part of fluid receiving part 15a is positioned within part 10c or the part projecting from part 10c is reduced, water resistance can be decreased upon radiation of rotor 10. Further, on the stopper part 15b side of rotor 10, an R-shaped arc part 10d slightly larger than stopper part 15b is formed around support shaft 16.

The action of this embodiment will hereafter be explained. The action of the present embodiment is approximately the same as the action of the eight embodiment (FIG. 8). water flowing the direction indicated by arrow A is received by fluid receiving part 15a of impeller blade 15 (151) positioned in fluid passage 20, thereby rotating rotor 10 in the direction indicated by arrow C. Further, impeller 15 (152, 153, 154, 156, 157) which has completely entered into impeller blade passage frame body 22 from fluid passage 20 is pushed down such that fluid receiving part 15a abuts rotor 10 by means of fluid pressure in impeller blade passage frame body 22 generated by rotation rotor 10 and also by means of weight 15a2. As such, fluid pressure is reduced on the returning movement side of impeller blade 15. Fluid receiving part 15a of impeller blade 15 (158) moving into fluid passage 20 is then erected by weight 15a2. Additionally, when arc shaped part 10d is formed on the stopper part 15b side, it is difficult for fluid to penetrate the back surface of stopper part 15b of impeller 15 (158), that is arc shaped part 10d, thus preventing blockage of the erection of impeller blade 15 (158).

A thirteenth embodiment of the inventive water wheel impeller type power generator will now be explained in reference to FIG. 18. The previous embodiment (FIG. 17) provides a configuration in which the distal end of fluid receiving part 15a serves as a weight 15a2. In the present embodiment, however, a weight is formed on the distal end on the surface opposite the fluid receiving part side of fluid receiving part 15a in a similar fashion as in the twelfth embodiment above. Therefore, the action described in the twelfth embodiment can be implemented in an identical manner.

What is claimed is:

1. A water wheel impeller type power generator comprising a rotating shaft transmitting power to a generator, a rotor fixed onto this rotating shaft, and impeller blades provided on the outer periphery of this rotor and serving to rotate the aforementioned rotor by receiving a flow of fluid, wherein
a fluid passage frame body is disposed below the aforementioned rotor to form a fluid passage, with the aforementioned impeller blades being rotatably disposed on the aforementioned rotor,
a fluid receiving part and a stopper part shorter than this fluid receiving part are both formed in an L shape,
the aforementioned stopper part is disposed on the side of the fluid receiving part receiving fluid pressure from the fluid passage such as to maintain the fluid receiving part in an erected position,
an impeller blade passage frame body is disposed on the outer periphery of the aforementioned rotor in such a way as to surround the rotor without inhibiting rotation of the aforementioned impeller blades, and
a weight is provided on the aforementioned fluid receiving part.

2. The water wheel impeller type power generator of claim 1, further comprising an inclined plate provided on the upper plate of the aforementioned fluid passage frame body and sloping in the fluid flow direction to the inlet side of the fluid passage, and additionally comprising an impeller blade erecting passage pipe provided such as to communicate from the aforementioned upper plate of the fluid receiving side of the aforementioned inclined plate to the inside of the impeller blade passage frame body, wherein one side of the aforementioned impeller blade erecting passage pipe on the side of the aforementioned inclined plate is larger in diameter than the other end thereof on the side of the impeller blade passage frame body.

\* \* \* \* \*